US010057949B2

(12) United States Patent
Motomura et al.

(10) Patent No.: US 10,057,949 B2
(45) Date of Patent: Aug. 21, 2018

(54) SIGNAL TRANSMITTING DEVICE, SIGNAL RECEIVING DEVICE, LIGHTING SYSTEM, ILLUMINATION FIXTURE, AND ILLUMINATION SYSTEM

(71) Applicant: Panasonic Intellectual Property Management Co., Ltd., Osaka (JP)

(72) Inventors: Masashi Motomura, Osaka (JP); Hirofumi Konishi, Osaka (JP); Kenichi Fukuda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 34 days.

(21) Appl. No.: 15/494,604

(22) Filed: Apr. 24, 2017

(65) Prior Publication Data
US 2017/0318634 A1    Nov. 2, 2017

(30) Foreign Application Priority Data

Apr. 27, 2016  (JP) ................................. 2016-089525
Jul. 29, 2016  (JP) ................................. 2016-150054

(51) Int. Cl.
*H05B 33/08* (2006.01)
*F21S 8/04* (2006.01)
(Continued)

(52) U.S. Cl.
CPC .......... *H05B 33/0815* (2013.01); *F21S 8/046* (2013.01); *F21V 3/00* (2013.01);
(Continued)

(58) Field of Classification Search
CPC .. H05B 33/0815; H05B 37/02; H05B 37/029; H05B 37/0821; H05B 41/28; H05B 33/0842; H05B 33/0845; H05B 33/0848; H02M 3/33507; H02M 3/156; H02M 7/53871; H02M 3/33584; H02M 2001/0048; Y02B 20/42
See application file for complete search history.

(56) References Cited

U.S. PATENT DOCUMENTS 8,664,883 B2 *  3/2014  Hiramatu ........... H05B 33/0815
                                              315/291
8,729,827 B2 *  5/2014  Esaki ..................... H05B 37/02
                                              315/257
(Continued)

FOREIGN PATENT DOCUMENTS

JP        2010-287372 A      12/2010

*Primary Examiner* — Haissa Philogene
(74) *Attorney, Agent, or Firm* — Renner, Otto, Boisselle & Sklar, LLP

(57) ABSTRACT

A signal transmitting device includes an input unit, an output unit, and a step-down circuit. The input unit is configured to receive an input voltage. The output unit is configured to output an output voltage. The step-down circuit is configured to controllably adjust the output voltage by stepping down the input voltage. The step-down circuit includes first and second capacitors, a switch circuit, an inductor, first and second diodes, and a control circuit. The switch circuit includes a series circuit of first and second switches. The control circuit is configured to control the first and second switches to change a voltage value of the output voltage in order to transmit transmission data from the output unit.

21 Claims, 7 Drawing Sheets

(51) Int. Cl.
  *F21V 3/00*    (2015.01)
  *F21V 21/34*   (2006.01)
  *F21V 23/06*   (2006.01)
  *H02M 3/158*   (2006.01)
  *H02M 7/04*    (2006.01)
  *H05B 37/02*   (2006.01)
  *F21Y 115/10*  (2016.01)
  *H02M 1/00*    (2006.01)

(52) U.S. Cl.
  CPC .............. *F21V 21/34* (2013.01); *F21V 23/06* (2013.01); *H02M 3/158* (2013.01); *H02M 3/1588* (2013.01); *H02M 7/04* (2013.01); *H05B 33/0845* (2013.01); *H05B 37/02* (2013.01); *F21Y 2115/10* (2016.08); *H02M 2001/0048* (2013.01)

(56) References Cited

U.S. PATENT DOCUMENTS

| | | | |
|---|---|---|---|
| 9,089,020 B2* | 7/2015 | Watanabe | H05B 33/0815 |
| 9,154,000 B2* | 10/2015 | Sato | H02J 9/062 |
| 9,762,126 B2* | 9/2017 | Ide | H02M 3/158 |
| 2017/0188421 A1* | 6/2017 | Motomura | H05B 33/0815 |
| 2017/0223790 A1* | 8/2017 | Motomura | H05B 33/0815 |
| 2017/0223791 A1* | 8/2017 | Fukuda | H05B 33/0815 |

\* cited by examiner

SIGNAL TRANSMITTING DEVICE, SIGNAL RECEIVING DEVICE, LIGHTING SYSTEM, ILLUMINATION FIXTURE, AND ILLUMINATION SYSTEM

CROSS REFERENCE TO RELATED APPLICATION

This application claims the benefit and priority of Japanese Patent Application No. 2016-089525, filed on Apr. 27, 2016 and Japanese Patent Application No. 2016-150054, filed on Jul. 29, 2016, the entire contents of which are incorporated herein by reference.

TECHNICAL FIELD

The present disclosure relates to, in general, signal transmitting devices, signal receiving devices, lighting systems, illumination fixtures, and illumination systems. Specifically, the present disclosure relates to a signal transmitting device configured to change the voltage value of a DC voltage in order to transmit transmission data, and a signal receiving device configured to receive the transmission data transmitted from the signal transmitting device. Also, the present disclosure relates to a lighting system that includes the signal transmitting device, the signal receiving device, and a lighting device, an illumination fixture including the signal receiving device, a lighting device, and a light source, an illumination system that includes the lighting system and a light source, and an illumination system that includes the signal transmitting device and the illumination fixture.

BACKGROUND ART

Conventionally, as described in Document 1 (JP 2010-287372 A), an LED illumination system that includes a dimmer, a power supply device, and a light source device has been proposed.

The power supply device of the LED illumination system described in Document 1 includes an AC/DC converter and a dimming interface. The dimming interface is configured to superpose a dimming signal from a dimmer on a DC voltage obtained from the AC/DC converter. The light source device includes a current controller and an LED light source device. The current controller is configured to receive a voltage (a signal superposed voltage) from the dimming interface and to light the LED light source device by a power supply, which the signal superposed voltage is employed as, while controlling the light output of the LED light source device based on the signal superposed voltage.

Notably, the dimming interface of the LED illumination system described in Document 1 has a complex circuit configuration, and includes at least seven transistors. It is possible that a loss (such as switching loss) in the seven transistors will be large. That is, it is difficult to reduce the loss in the aforementioned dimming interface.

SUMMARY

An object of the present disclosure is to provide a signal transmitting device, a signal receiving device, a lighting system, an illumination fixture, and an illumination system, which realize low loss.

A signal transmitting device according to one aspect of the present disclosure includes an input unit, an output unit, and a step-down circuit. The input unit includes first and second input terminals configured to receive a DC input voltage. The output unit includes first and second output terminals configured to output a DC output voltage. The first output terminal is electrically connected to the first input terminal. The step-down circuit is provided between the input unit and the output unit. The step-down circuit is configured to controllably adjust the output voltage by stepping down the input voltage. The step-down circuit includes first and second capacitors, a switch circuit, an inductor, first and second diodes, and a control circuit. The first capacitor is electrically connected between the first and second input terminals. The second capacitor is electrically connected between the first and second output terminals. The switch circuit includes a series circuit of first and second switches. The switch circuit is electrically connected in parallel to the first capacitor. The inductor includes first and second terminals. The first terminal of the inductor is electrically connected to a connection point of the first and second switches, and the second terminal of the inductor is electrically connected to a connection point of the second capacitor and the second output terminal. The first diode is electrically connected in parallel to the first switch. The first diode also has a cathode electrically connected to a terminal of the first switch on a high potential side of the first switch and an anode electrically connected to a terminal of the first switch on a low potential side of the first switch. The second diode is electrically connected in parallel to the second switch. The second diode also has a cathode electrically connected to a terminal of the second switch on a high potential side of the second switch and an anode electrically connected to a terminal of the second switch on a low potential side of the second switch. The control circuit is configured to control the first and second switches. The control circuit is configured to control the first and second switches to change a voltage value of the output voltage in order to transmit transmission data from the output unit.

A signal receiving device according to one aspect of the present disclosure includes a connection portion and a receiving circuit. The connection portion is configured to be electrically connected to the output unit of the signal transmitting device. The receiving circuit is configured to detect a change in the voltage value of the output voltage that is inputted to the connection portion to obtain the transmission data.

A lighting system according to one aspect of the present disclosure includes the signal transmitting device of the above aspect, a signal receiving device, and a lighting device. The signal receiving device includes a connection portion and a receiving circuit. The connection portion is electrically connected to the output unit of the signal transmitting device. The receiving circuit is configured to detect a change in the voltage value of the output voltage that is inputted to the connection portion to obtain the transmission data. The lighting device is configured to light a light source by the output voltage outputted from the output unit. The lighting device is also configured to change the output to the light source based on the transmission data obtained by the receiving circuit of the signal receiving device.

An illumination fixture according to one aspect of the present disclosure includes the signal receiving device of the above aspect, a light source, and a lighting device. The lighting device is configured to light the light source by the output voltage outputted from the output unit of the signal transmitting device. The lighting device is also configured to change the output to the light source based on the transmission data obtained by the receiving circuit of the signal receiving device.

An illumination system according to one aspect of the present disclosure includes the lighting system of the above aspect, the light source, a DC power supply device, and an operation device. The light source is configured to be lit by the lighting device of the lighting system. The DC power supply device is configured to apply the input voltage to the input unit of the signal transmitting device in the lighting system. The operation device is configured to receive an operation input and output an operation signal to the signal transmitting device. The signal transmitting device is configured to transmit the transmission data based on the operation signal.

An illumination system according to one aspect of the present disclosure includes the signal transmitting device of the above aspect, an illumination fixture, a DC power supply device, and an operation device. The illumination fixture includes a signal receiving device that includes a connection portion and a receiving circuit. The connection portion is electrically connected to the output unit of the signal transmitting device. The receiving circuit is configured to detect a change in the voltage value of the output voltage that is inputted to the connection portion to obtain the transmission data. The DC power supply device is configured to apply the input voltage to the input unit of the signal transmitting device. The operation device is configured to receive an operation input and output an operation signal to the signal transmitting device. The signal transmitting device is configured to transmit the transmission data based on the operation signal.

DETAILED DESCRIPTION

Figure 1:
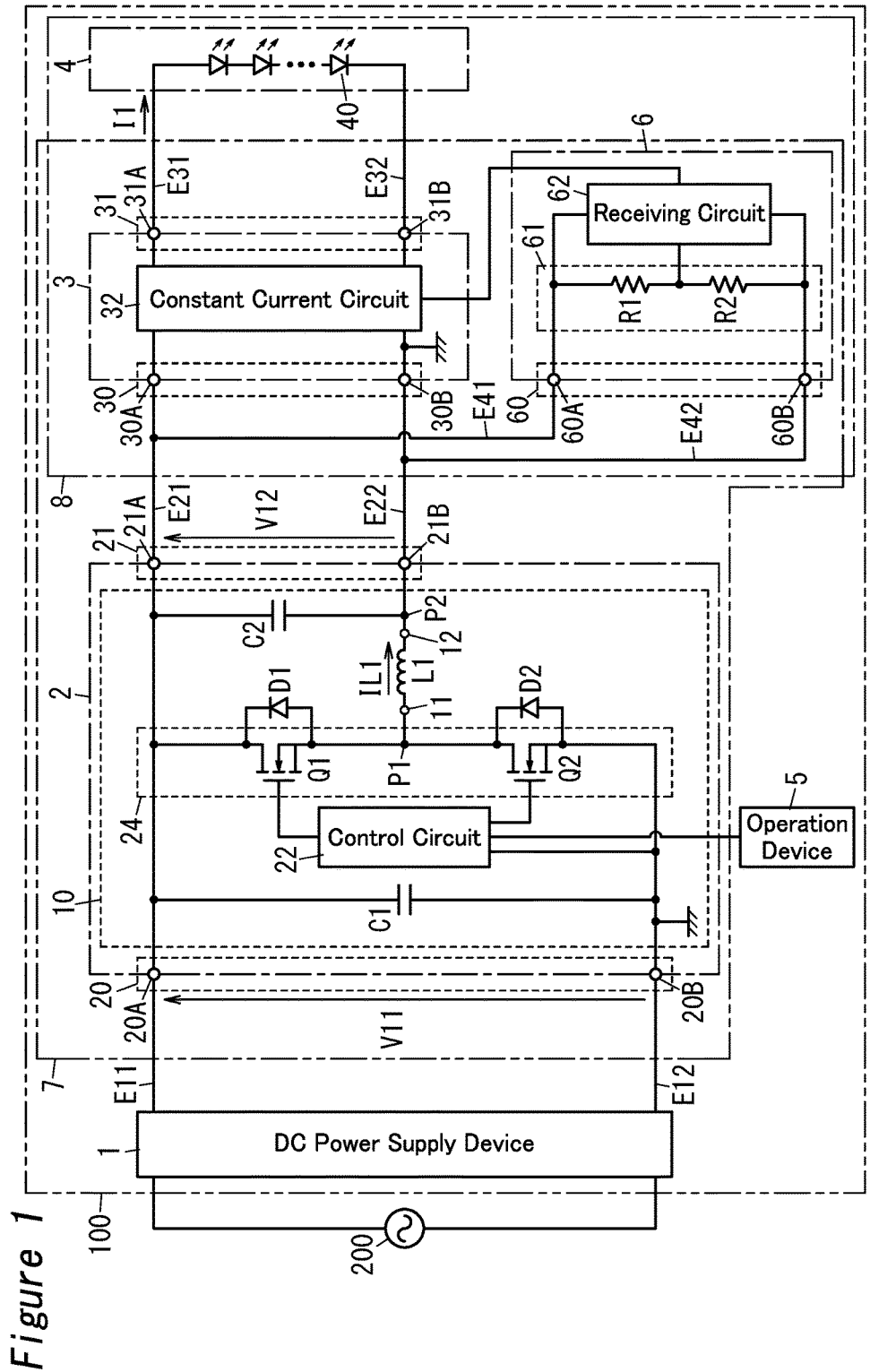
FIG. 1 is a diagram of a configuration of an illumination system including a signal transmitting device, a signal receiving device, a lighting system, and an illumination fixture, in accordance with one embodiment.

Hereinafter, a signal transmitting device 2 of one embodiment will be described with reference to FIGS. 1 to 5. Preferably, the signal transmitting device 2 includes an input unit 20, an output unit 21, and a step-down circuit 10, as shown in FIG. 1.

Preferably, the input unit 20 includes first and second input terminals 20A and 20B configured to receive a DC input voltage V11. The second input terminal 20B may be electrically connected to ground (ground of the signal transmitting device 2). That is, the first input terminal 20A may be an input terminal on a high potential side, and the second input terminal 20B may be an input terminal on a low potential side. Here, "being electrically connected" means being connected directly or indirectly.

Preferably, the input unit 20 is electrically connected to a later-described DC power supply device 1 via a pair of feeding paths E11 and E12. The first input terminal 20A may be electrically connected to one end of the feeding path E11. The second input terminal 20B may be electrically connected to one end of the feeding path E12. The other ends of the pair of feeding paths E11 and E12 may be electrically connected to the DC power supply device 1. In the present embodiment, the input unit 20 is to receive the input voltage V11 via the pair of feeding paths E11 and E12. That is, the DC power supply device 1 is preferably configured to apply the input voltage V11 to the input unit 20.

Preferably, the output unit 21 includes first and second output terminals 21A and 21B configured to output a DC output voltage V12. The output unit 21 may be electrically connected to a later-described lighting device 3 via a pair of feeding paths E21 and E22. The first output terminal 21A may be electrically connected to one end of the feeding path E21. The second output terminal 21B may be electrically connected to one end of the feeding path E22. The other ends of the pair of feeding paths E21 and E22 may be electrically connected to the lighting device 3. In the present embodiment, the output unit 21 is to output the output voltage V12 via the pair of feeding paths E21 and E22. That is, the lighting device 3 preferably functions by a power supply which the output voltage V12 outputted from the output unit 21 is employed as. In this example, the power supplied from the DC power supply device 1 to the lighting device 3 via the signal transmitting device 2 is DC power, and the power distribution from the DC power supply device 1 to the lighting device 3 is a DC power distribution. The voltage value of the output voltage V12 may be in a range from 30 [V] to 40 [V], for example.

Preferably, the step-down circuit 10 is configured to controllably adjust the output voltage V12 by stepping down the input voltage V11. In other words, the step-down circuit 10 may be configured such that enabling and disabling the function of stepping down the input voltage V11 can be switched. The step-down circuit 10 may include two capacitors C1 and C2, an inductor L1, two switches Q1 and Q2, and a control circuit 22, as shown in FIG. 1. Each of the two switches Q1 and Q2 may be, for example a normally-off MOSFET (Metal Oxide Semiconductor Field Effect Transistor). Note that, hereinafter, the capacitor C1 is referred to as a "first capacitor C1", and the capacitor C2 is referred to as a "second capacitor C2", for the convenience of description. Also, in the present embodiment, the switch Q1 corresponds to a first switch, and the switch Q2 corresponds to a second switch. Accordingly, hereinafter, the switch Q1 is referred to as a "first switch Q1", and the switch Q2 is referred to as a "second switch Q2".

Preferably, the first capacitor C1 is an input capacitor, and is electrically connected in parallel to the input unit 20. That is, the first capacitor C1 may be electrically connected between the first and second input terminals 20A and 20B. A terminal, on a high potential side, of the first capacitor C1 may be electrically connected to a drain of the first switch Q1. A gate of the first switch Q1 may be electrically connected to the control circuit 22. A source of the first switch Q1 may be electrically connected to a drain of the second switch Q2. A gate of the second switch Q2 may be electrically connected to the control circuit 22. A source of the second switch Q2 may be electrically connected to a terminal, on a low potential side, of the first capacitor C1. A source of the second switch Q2 may be also electrically connected to the control circuit 22. In the present embodiment, a series circuit of the first and second switches Q1 and Q2 constitute a switch circuit 24, and the switch circuit 24 is electrically connected in parallel to the first capacitor C1. In the example of FIG. 1, a diode D1 represents an internal diode (a body diode) of the first switch Q1. That is, the internal diode D1 is electrically connected in parallel to the first switch Q1. Specifically, a cathode of the internal diode D1 is electrically connected to a terminal, on a high potential side, of the first switch Q1 (drain of the first switch Q1), and an anode of the internal diode D1 is electrically connected to a terminal, on a low potential side, of the first switch Q1 (source of the first switch Q1). Also, in the example of FIG. 1, a diode D2 represents an internal diode of the second switch Q2. That is, the internal diode D2 is electrically connected in parallel to the second switch Q2. Specifically, a cathode of the internal diode D2 is electrically connected to a terminal, on a high potential side, of the second switch Q2 (drain of the second switch Q2), and an anode of the internal diode D2 is electrically connected to a terminal, on a low potential side, of the second switch Q2 (source of the second switch Q2). In short, in the present embodiment, the internal diode D1 corresponds to a first diode, and the internal diode D2 corresponds to a second diode.

The drain of the first switch Q1 may be electrically connected to a terminal, on a high potential side, of the second capacitor C2. A terminal, on a low potential side, of the second capacitor C2 may be electrically connected to the source of the first switch Q1 via the inductor L1. Specifically, a first terminal 11 of the inductor L1 may be electrically connected to the source of the first switch Q1, and a second terminal 12 of the inductor L1 may be electrically connected to the terminal, on the low potential side, of the second capacitor C2. In other words, the first terminal 11 of the inductor L1 may be electrically connected to a connection point (first connection point) P1 of the first and second switches Q1 and Q2. The second terminal 12 of the inductor L1 may be electrically connected to a connection point (second connection point) P2 of the second capacitor C2 and the second output terminal 21B.

Preferably, the second capacitor C2 is an output capacitor, and is electrically connected in parallel to the output unit 21. That is, the second capacitor C2 may be electrically connected between the first output terminal 21A and the second output terminal 21B.

Preferably, the control circuit 22 is configured to control the first and second switches Q1 and Q2. The control circuit 22 may be composed of hardware such as a CPU (Central Processing Unit) and a memory, and a program to be executed by the CPU. The control circuit 22 may also include a timer. Preferably, the program is stored in the memory and, for example a program for executing the herein described control modes of the control circuit 22 is written therein. The control circuit 22 may include first and second control modes as the control modes. Preferably, the first control mode is a control mode in which the voltage value of the output voltage V12 is prohibited from changing, and the second control mode is a control mode in which the voltage value of the output voltage V12 is caused to change so as to transmit transmission data from the output unit 21. Here, "controlling the first and second switches Q1 and Q2" includes not only a case where the control circuit 22 turns on the first and second switches Q1 and Q2, but also a case where the control circuit 22 turns off the first and second switches Q1 and Q2. Note that details of the transmission data will be described later.

Preferably, the control circuit 22 is configured to receive an operation signal from a later-described operation device 5. The control circuit 22 may also be configured to select one of the first and second control modes based on whether or not an operation signal is inputted. Note that, in the present embodiment, the control circuit 22 is configured to select, regardless of the operation signal, the first control mode as the control mode when the input voltage V11 is applied to the input unit 20 of the signal transmitting device 2 from the DC power supply device 1.

Figure 2:
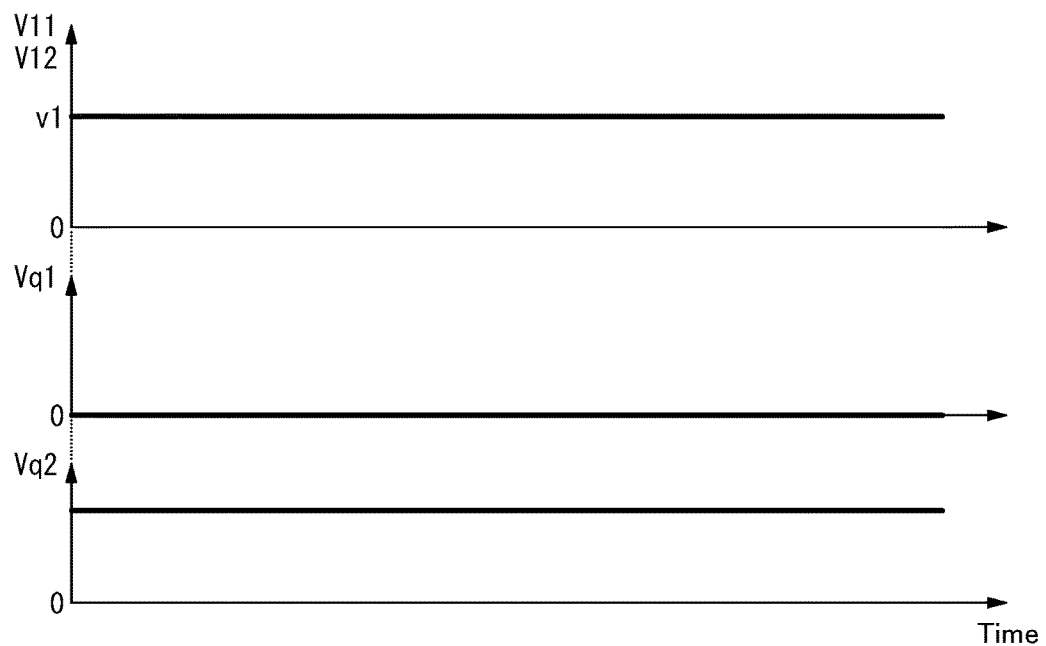
FIG. 2 is a timing chart for describing a function of the signal transmitting device.

Preferably, in the case where the control mode is the first control mode, the control circuit 22 keeps the first switch Q1 in an Off state, and keeps the second switch Q2 in an On state, as shown in FIG. 2. Accordingly, in the signal transmitting device 2, the voltage value (output voltage value) of the output voltage V12 becomes the same as the voltage value (input voltage value) of the input voltage V11 (in the exemplary embodiment, first voltage value v1). That is, in the case where the control mode is the first control mode, the control circuit 22 may output the input voltage V11 inputted to the input unit 20 from the output unit 21 as the output voltage V12. Note that in the example of FIG. 2, the reference sign "Vq1" represents the gate voltage of the first switch Q1, and the reference sign "Vq2" represents the gate voltage of the second switch Q2. Also, "becoming the same" includes not only a case where the difference between the input voltage value and the output voltage value is zero, but also a case where the difference between the input voltage value and the output voltage value is a value that is small enough to be regarded as substantially zero. For example, a case is included where the output voltage value has a smaller value than the input voltage value due to a voltage drop at an electronic component that constitutes the step-down circuit 10.

Preferably, the control circuit 22 is configured to, when an operation signal is inputted from the operation device 5, convert an instruction contained in the operation signal into transmission data. The control circuit 22 may be also configured to, when the operation signal is inputted from the operation device 5, select the second control mode as the control mode to control the first and second switches Q1 and Q2 based on the converted transmission data. In the present embodiment, the instruction contained in the operation signal is an instruction to change the output (output current) of the lighting device 3. Specifically, the instruction contained in the operation signal is an instruction to change the lighting state of a later-described light source 4 (e.g., dimming level of the light source 4).

Figure 3:
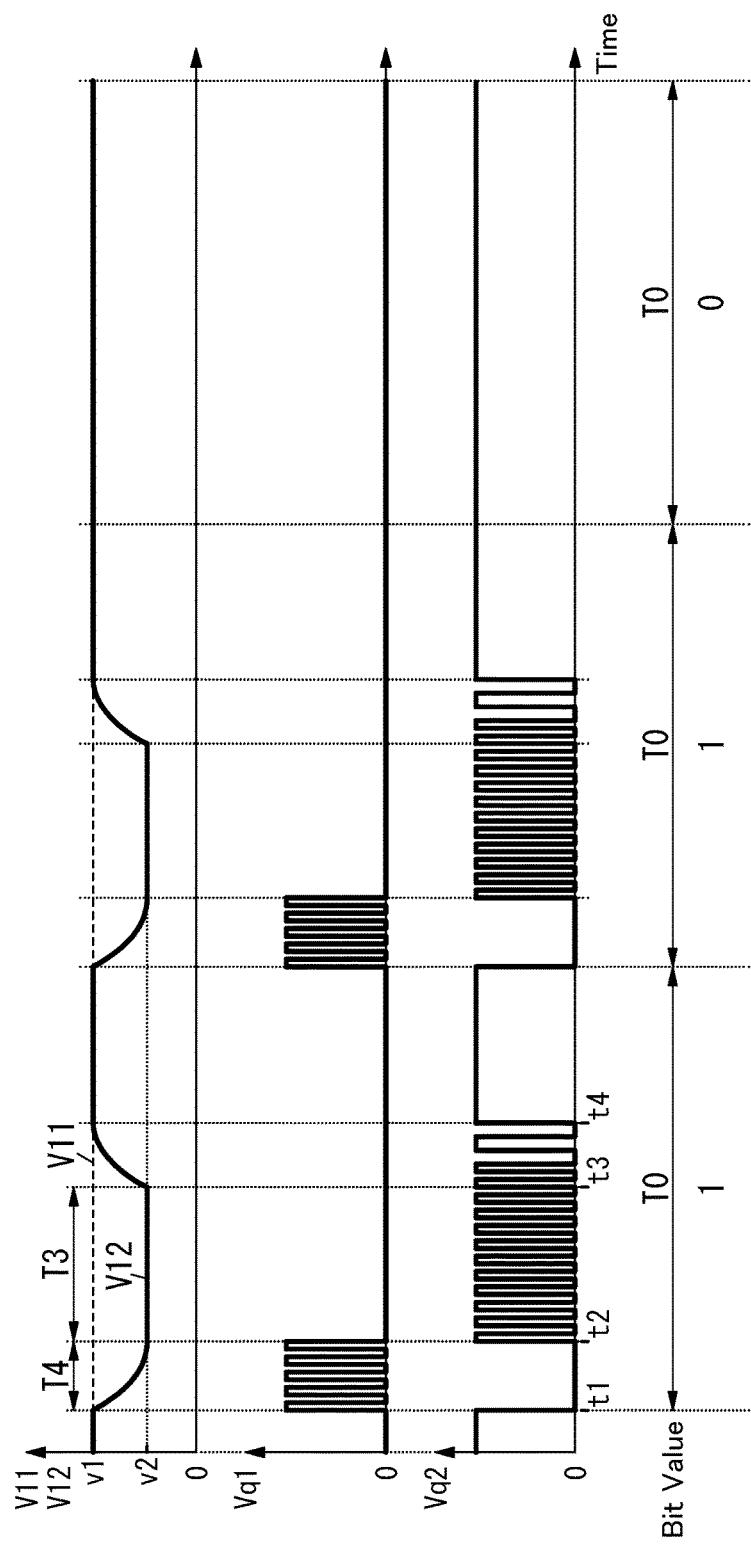
FIG. 3 is a timing chart for describing another function of the signal transmitting device.

The control circuit 22 may be configured to, in the case where the control mode is the second control mode, control the first and second switches Q1 and Q2 such that the voltage value of the output voltage V12 changes as shown in FIG. 3. Specifically, in the case where the control mode is the second control mode, the control circuit 22 may control the first and second switches Q1 and Q2 such that the voltage value of the output voltage V12 is switched between first and second voltage values v1 and v2. Also, in the case where the control mode is the second control mode, the control circuit 22 may switch the voltage value of the output voltage V12 between the first and second voltage values v1 and v2 so as to transmit transmission data from the output unit 21. Preferably, the first voltage value v1 has the same value as the voltage value of the input voltage V11, and the second voltage value v2 is a value obtained by stepping down the input voltage V11 and is a value that is smaller than the first voltage value v1. Note that in the example of FIG. 3, the reference sign "Vq1" represents a gate voltage of the first switch Q1 and the reference sign "Vq2" represents a gate voltage of the second switch Q2.

Preferably, the transmission data is information for changing the lighting state of the light source 4 (dimming level of the light source 4). The dimming level means the degree of light output of the light source 4. The dimming level when the light source 4 is fully lit (rated lighting) is defined as 100 [%]. The transmission data may be constituted by an 8-bit bit string that is associated with a dimming level having 256 levels in one-to-one correspondence. For example, the dimming level at 100 [%] is associated with a bit string "00000000". The dimming level at 50 [%] is associated with, e.g., a bit string "01111111". The dimming level at 0 [%] is associated with, e.g., a bit string "11111111". Note that the dimming level need not be 256 levels, but may be 128 levels or 512 levels. That is, the dimming level need not be represented by 8 bits, but may be represented by 7 bits or 9 bits. The dimming level may have, for example several levels or several tens of levels. Also, the dimming level at 50 [%] need not be associated with a bit string "01111111", but may be associated with, e.g., a bit string "10000000". Also, the dimming level may change continuously (increase or decrease), or may change stepwise.

Preferably, the control circuit 22 is configured to, in the case where the value of an arbitrary bit (bit value) of the transmission data is "1", repeatedly turn on and off the first switch Q1 at a fixed period with the second switch Q2 kept in an off state such that the voltage value of the output voltage V12 becomes the second voltage value v2. That is, in the case where an arbitrary bit value of the transmission data is "1", the control circuit 22 may repeatedly turn on and off the first switch Q1 with the second switch Q2 kept in an off state such that the voltage value of the output voltage V12 is stepped down from the first voltage value v1 to the second voltage value v2. In the present embodiment, by repeatedly turning on and off the first switch Q1 with the second switch Q2 kept in an off state, the control circuit 22 discharges a charge accumulated in the second capacitor C2 to step down the voltage value of the output voltage V12 from the first voltage value v1 to the second voltage value v2.

Figure 4:
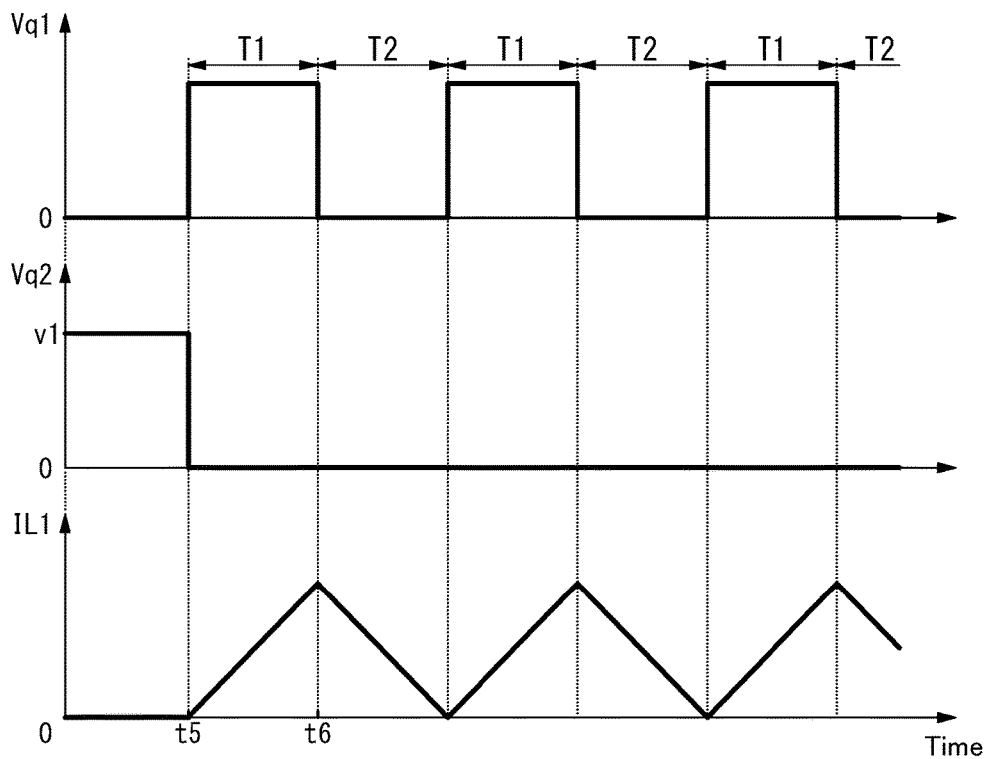
FIG. 4 relates to the other function of the signal transmitting device, and is a waveform diagram for describing a change in a current that flows through an inductor.

In this case, when the first switch Q1 is in an on state and the second switch Q2 is in an off state, the charge accumulated in the second capacitor C2 are discharged in a path (discharging path) from the terminal on the high potential side of the second capacitor C2 to the first switch Q1, the inductor L1, and the terminal on the low potential side of the second capacitor C2. At this time, a current IL1 that flows through the inductor L1 increases in the signal transmitting device 2, and therefore the current IL1 may exceed the rated current of the inductor L1. Therefore, as shown in FIG. 4, the control circuit 22 preferably turns off the first and second switches Q1 and Q2 such that the current IL1 does not exceed the rated current, when a first predetermined time T1 has elapsed from when the first switch Q1 is turned on and the second switch Q2 is turned off. The first predetermined time T1 may be, for example 0.1 [ms]. In this case, the discharging path is a path from the terminal on the high potential side of the second capacitor C2 to the first capacitor C1, the internal diode D2 of the second switch Q2, the inductor L1, and the terminal on the low potential side of the second capacitor C2. Also, in this case, the current IL1 flowing through the inductor L1 decreases in the signal transmitting device 2. Note that a time t5 in FIG. 4 represents a point in time when the first switch Q1 is turned on and the second switch Q2 is turned off. Also, a time t6 in FIG. 4 represents a point in time when the first and second switches Q1 and Q2 are turned off. Note that the reference sign "Vq1" in FIG. 4 represents the gate voltage of the first switch Q1, and the reference sign "Vq2" in FIG. 4 represents the gate voltage of the second switch Q2.

Preferably, as shown in FIG. 4, the control circuit 22 is configured to turn on the first switch Q1 and keep the second switch Q2 in an off state, when a second predetermined time T2 has elapsed from when the first and second switches Q1 and Q2 were turned off. The second predetermined time T2 may be, for example 0.1 [ms]. That is, the control circuit 22 may alternately repeat a case where the first switch Q1 is in an on state and the second switch Q2 is in an off state and a case where the first and second switches Q1 and Q2 are in an off state. Accordingly, in the signal transmitting device 2, the current IL1 can be prevented from exceeding the rated current, and a charge accumulated in the second capacitor C2 can be discharged.

Preferably, the control circuit 22 is configured to repeatedly turn on and off the second switch Q2 at a fixed period with the first switch Q1 kept in an off state, when the voltage value of the output voltage V12 reaches the second voltage value v2 (time period from time t2 to time t3 in FIG. 3). Accordingly, the control circuit 22 can keep the voltage value of the output voltage V12 at the second voltage value v2. The control circuit 22 may also repeatedly turn on and off the second switch Q2 with the first switch Q1 kept in an off state, when a third predetermined time T3 has elapsed from when the voltage value of the output voltage V12 reached the second voltage value v2 (time period from time t3 to time t4 in FIG. 3). The third predetermined time T3 may be, for example 10 [ms]. Accordingly, the control circuit 22 can switch the voltage value of the output voltage V12 from the second voltage value v2 to the first voltage value v1. Note that the time t1 in FIG. 3 indicates a point in time when the output voltage V12 has started to change (fall). The time t2 in FIG. 3 indicates a point in time when the voltage value of the output voltage V12 has reached the second voltage value v2. The time t3 in FIG. 3 indicates a point in time when the third predetermined time T3 has elapsed from when the voltage value of the output voltage V12 reached the second voltage value v2. The time t4 in FIG. 3 indicates a point in time when the voltage value of the output voltage V12 has switched from the second voltage value v2 to the first voltage value v1.

On the other hand, the control circuit 22 may be configured to, in the case where the value of an arbitrary bit of the transmission data is "0", keep the first switch Q1 in an off state and keep the second switch Q2 in an on state such that the voltage value of the output voltage V12 becomes the first voltage value v1. That is, in the case where the value of an arbitrary bit of the transmission data is "0", the control circuit 22 may keep the first switch Q1 in an off state and keep the second switch Q2 in an on state such that the voltage value of the output voltage V12 is kept at the first voltage value v1.

Preferably, the control circuit 22 forms a time period (transmission time period) in which 8-bit transmission data is transmitted from the output unit 21, with eight time slots. Each of the eight time slots may have a fixed time width T0 (refer to FIG. 3). In the case where the value of an arbitrary bit of the transmission data is "1", the control circuit 22 may switch the voltage value of the output voltage V12 from the first voltage value v1 to the second voltage value v2 in a time width T4 (time period from time t1 to time t2 in FIG. 3) that is shorter than the time width T0 of the time slot. Note that in the example of FIG. 3, the voltage value of the output voltage V12 is kept at the second voltage value v2 in a time period from time t2 to time t3. Also, in the example of FIG. 3, the voltage value of the output voltage V12 changes from the second voltage value v2 to the first voltage value v1 in a time period from time t3 to time t4.

The control circuit 22 may gradually increase the On time of the second switch Q2, when repeatedly turning on and off the second switch Q2 with the first switch Q1 kept in an off state in the case of switching the voltage value of the output voltage V12 from the second voltage value v2 to the first voltage value v1. Specifically, the control circuit 22 may change the On time of the second switch Q2 such that the On time of the second switch Q2 gradually increases as the voltage value of the output voltage V12 approaches the first voltage value v1. That is, the control circuit 22 may increase the length of the On time of the second switch Q2 as the voltage value of the output voltage V12 approaches the first voltage value v1, in the case of switching the voltage value of the output voltage V12 from the second voltage value v2 to the first voltage value v1. Accordingly, in the signal transmitting device 2, the application of excessive stress on the second switch Q2 can be suppressed, compared with a case where the On time of the second switch Q2 is not changed when the second switch Q2 is repeatedly turned on and off with the first switch Q1 kept in an off state. Note that, in the present embodiment, the On time of the second switch Q2 is changed in the case where the voltage value of the output voltage V12 is changed from the second voltage value v2 to the first voltage value v1, but the On time of the second switch Q2 need not be changed. For example, the control circuit 22 may repeatedly turn on and off the second switch Q2 at a fixed period with the first switch Q1 kept in an off state, in the case of changing the voltage value of the output voltage V12 from the second voltage value v2 to the first voltage value v1.

Here, the control circuit 22 preferably controls the first and second switches Q1 and Q2 so as to transmit a start bit before a leading bit of the transmission data and transmit a stop bit after an end bit of the transmission data. The start bit may be a bit or a bit string for notifying the start of the transmission time period. The stop bit may be a bit or a bit string for notifying the end of the transmission time period. For example, the start bit is a bit string such as "111", and the stop bit is a bit string such as "000".

The control circuit 22 may transmit a signal (transmission signal) containing the start bit, the transmission data and the stop bit from the output unit 21 by changing the voltage value of the output voltage V12, in the case where the control mode is the second control mode. Note that, in the case where the data length of the transmission data is fixed, a later-described signal receiving device 6 can determine the end of the transmission time period even if the stop bit is not transmitted from the signal transmitting device 2.

Also, in a time period that differs from the transmission time period (time period other than the transmission time period), the control circuit 22 may keep the first switch Q1 in an off state and keep the second switch Q2 in an on state such that the voltage value of the output voltage V12 becomes the same as the voltage value of the input voltage V11. That is, the control circuit 22 may select the first control mode as the control mode after transmitting the transmission signal from the output unit 21.

Figure 5:
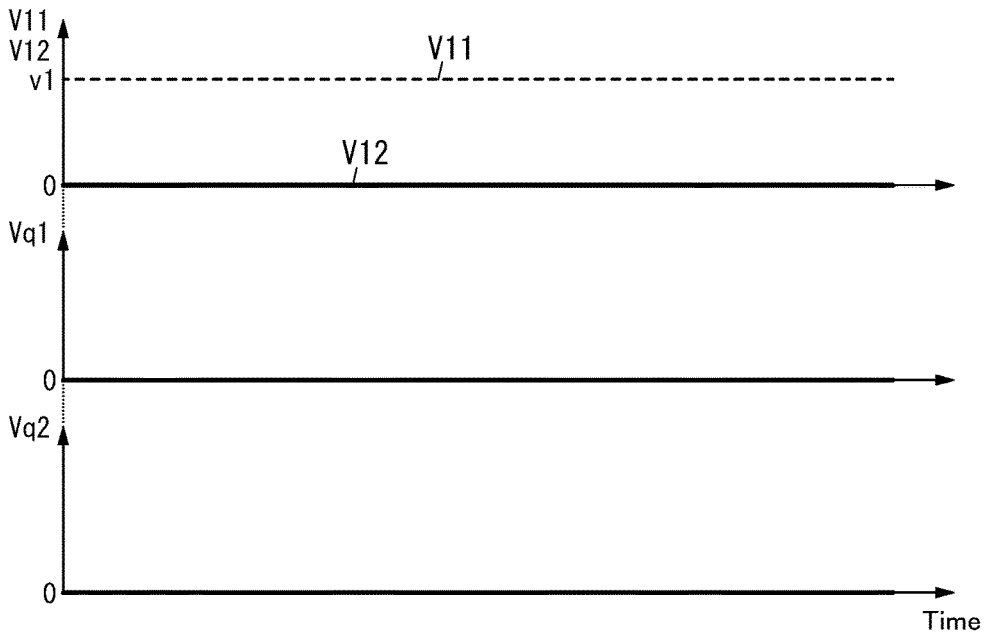
FIG. 5 is a timing chart for describing a function of the signal transmitting device in a third control mode.

Also, the control circuit 22 may further include a third control mode as the control mode. The third control mode is, for example a control mode in which the output of the step-down circuit 10 is stopped. The control circuit 22 may select the third control mode as the control mode when an abnormality occurs in the signal transmitting device 2, or when the light source 4 is turned off by setting the dimming level to 0 [%]. As shown in FIG. 5, the control circuit 22 may keep the first and second switches Q1 and Q2 in an off state, when the control mode is the third control mode. Accordingly, in the signal transmitting device 2, the voltage value of the output voltage V12 becomes zero, and the power supply to the lighting device 3 can be stopped. That is, in the signal transmitting device 2, the power supply to the lighting device 3 can be stopped by turning off the first and second switches Q1 and Q2, when an abnormality occurs in the signal transmitting device 2. Alternatively, in the signal transmitting device 2, the control circuit 22 can turn off the light source 4 by controlling the first and second switches Q1 and Q2 in the third control mode to stop the output of the step-down circuit 10. Note that the control circuit 22 keeps the first and second switches Q1 and Q2 in an off state in the case where the control mode is the third control mode, but the configuration is not limited thereto. Only the second switch Q2 may be kept in an off state. That is, the control circuit 22 may be configured such that at least the second switch Q2 is kept in an off state in the case where the control mode is the third control mode.

It will be noted that in the case where the signal receiving device 6 functions by the output voltage from the step-down circuit 10, similarly to the lighting device 3, the signal receiving device 6 may stop during a time period in which the output of the step-down circuit 10 is stopped. Then, when power supply is stopped, the content stored in a buffer memory (volatile semiconductor memory) of a control IC that constitutes a receiving circuit 62 of the later-described signal receiving device 6 will be lost. The content stored in the buffer memory includes, for example transmission data (dimming level) that the signal receiving device 6 has received from the signal transmitting device 2.

Figure 6:
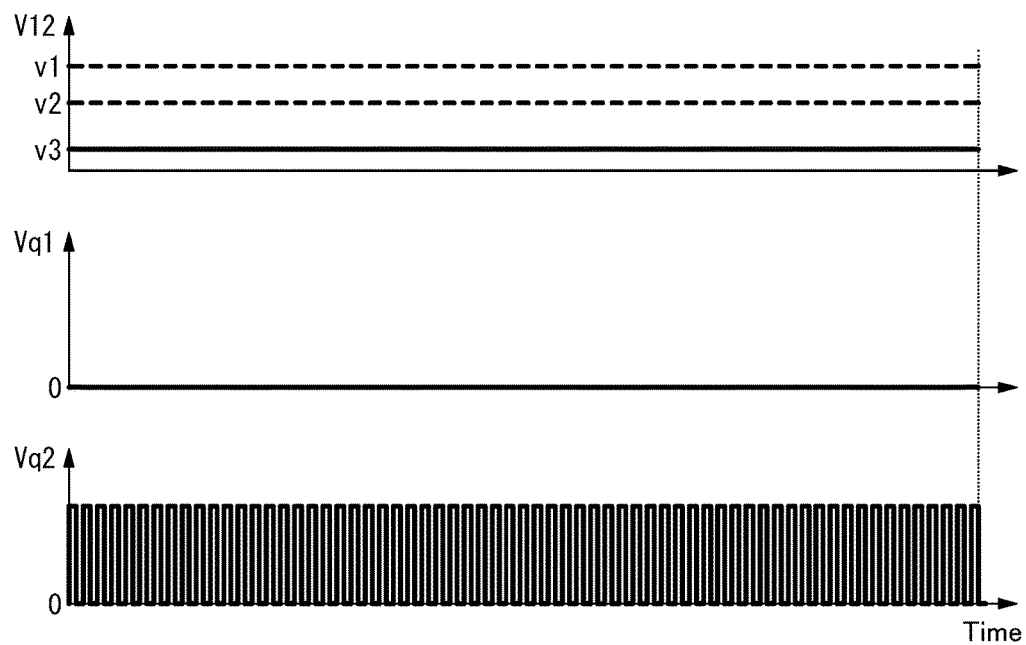
FIG. 6 is a timing chart for describing a function of the signal transmitting device in a fourth control mode.

Therefore, the control circuit 22 may include a fourth control mode as another control mode. Preferably, the fourth control mode is a control mode in which the voltage value of the output voltage V12 is kept at a third voltage value v3. The third voltage value v3 may be a value obtained by stepping down the input voltage V11, and may be lower than the second voltage value v2 and higher than 0 [V]. For example, the third voltage value v3 is preferably a voltage value that is greater than or equal to a voltage value at which the content stored in the buffer memory can be retained in the receiving circuit 62 of the signal receiving device 6. The control circuit 22 may select the fourth control mode as the control mode, for example when an operation signal containing an instruction to turn off the light source 4 is inputted from the operation device 5. Note that the control circuit 22 may transmit a transmission signal containing transmission data designating a dimming level at 0 [%] instead of selecting the fourth control mode, when the operation signal containing the instruction to turn off the light source 4 is inputted from the operation device 5. As shown in FIG. 6, the control circuit 22 may repeatedly turn on and off the second switch Q2 at a fixed period with the first switch Q1 kept in an off state, in the case where the control mode is the fourth control mode. Accordingly, the voltage value of the output voltage V12 can be kept at the third voltage value v3. Note that the control circuit 22 is preferably configured such that the time T5 during which the voltage value of the output voltage V12 is kept at the third voltage value v3 is longer than the time (time width T4) during which the voltage value of the output voltage V12 is adjusted to the second voltage value v2 in the second control mode. That is, in the case where the control circuit 22 changes the voltage value of the output voltage V12 from the third voltage value v3 to the first voltage value v1 in a time shorter than the time width T4, the signal receiving device 6 may erroneously detect the change from the third voltage value v3 to the first voltage value v1 as the transmission signal. Therefore, if the control circuit 22 makes the time, during which the voltage value of the output voltage V12 is kept at the third voltage value v3 in the fourth control mode, longer than the time width T4, erroneous detection of the transmission signal by the signal receiving device 6 can be prevented.

Figure 7:
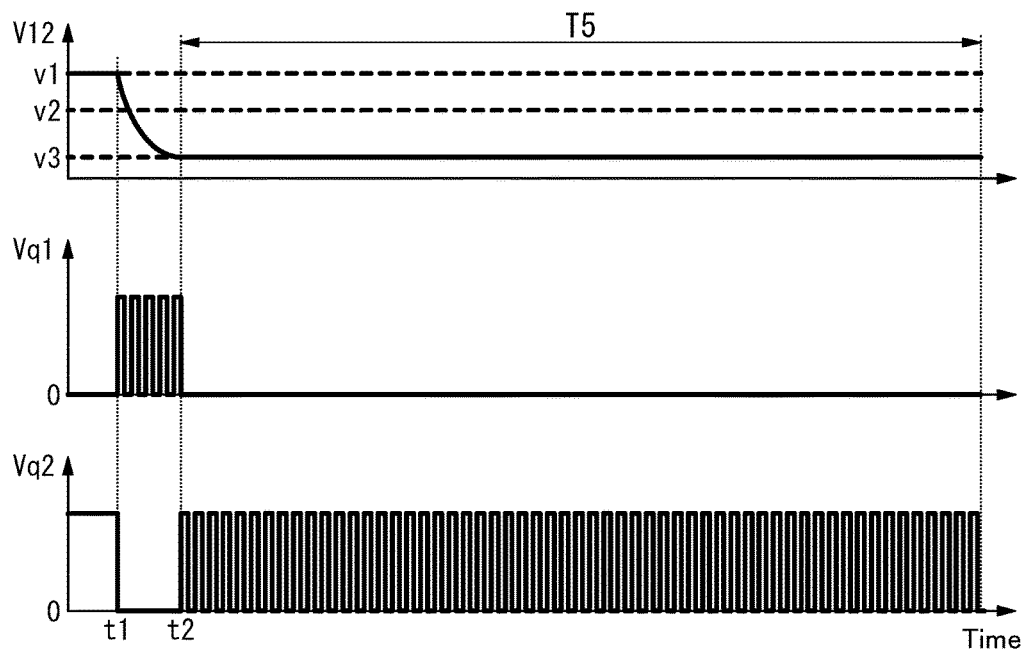
FIG. 7 is a timing chart for describing another function of the signal transmitting device in a fourth control mode.

Here, as shown in FIG. 7, the control circuit 22 may repeatedly turn on and off the first switch Q1 with the second switch Q2 kept in an off state, in the case where the control mode is shifted from the first control mode or the second control mode to the fourth control mode. Specifically, the control circuit 22 may repeatedly turn on and off the first switch Q1 at a fixed period with the second switch Q2 turned off, in a time period (time period from time t1 to time t2 in FIG. 7) immediately after being switched to the fourth control mode. Accordingly, in the signal transmitting device 2, the voltage value of the output voltage V12 can be quickly changed (decreased) from the first voltage value v1 to the third voltage value v3.

Figure 8:
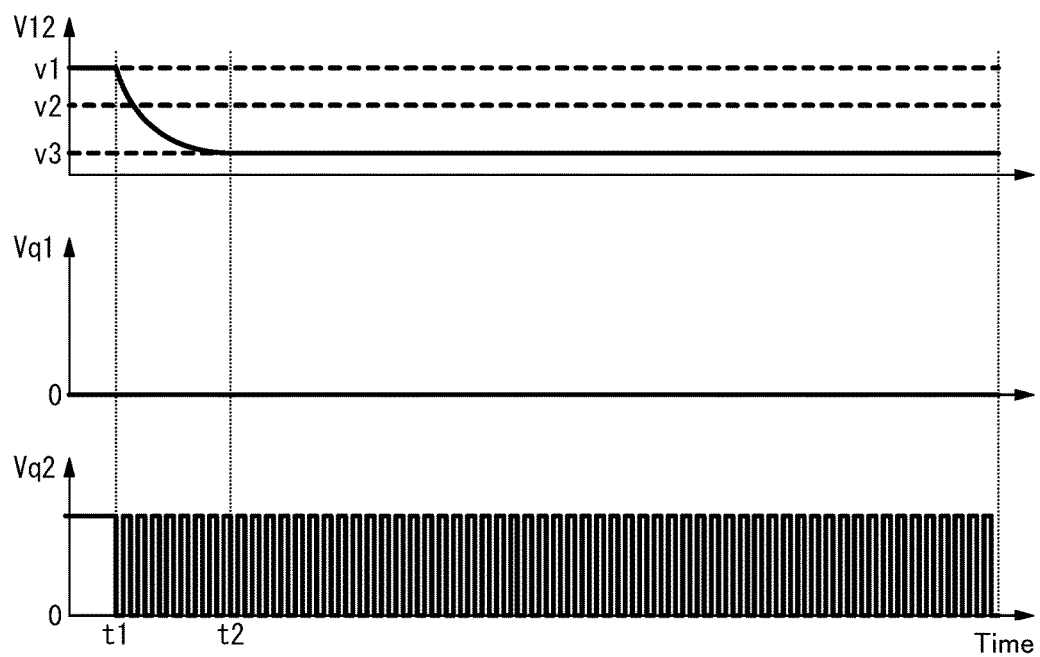
FIG. 8 is a timing chart for describing yet another function of the signal transmitting device in a fourth control mode.

Alternatively, as shown in FIG. 8, the control circuit 22 may repeatedly turn on and off the second switch Q2 with the first switch Q1 kept in an off state, in the case where the control mode is shifted from the first control mode or the second control mode to the fourth control mode. Specifically, the control circuit 22 may repeatedly turn on and off the second switch Q2 at a fixed period with the first switch Q1 kept in an off state, in a time period (time period from time t1 to time t2 in FIG. 8) immediately after the control mode is switched to the fourth control mode. Accordingly, in the signal transmitting device 2, the voltage value of the output voltage V12 can be gradually changed (decreased) from the first voltage value v1 to the third voltage value v3. Note that the control circuit 22 may make the On time of the second switch Q2 longer as the voltage value of the output voltage V12 approaches the third voltage value v3, in the case where the voltage value of the output voltage V12 is switched from the first voltage value v1 to the third voltage value v3. Accordingly, in the signal transmitting device 2, the application of excessive stress to the second switch Q2 can be suppressed, compared with a case where the On time of the second switch Q2 is not changed when the second switch Q2 is repeatedly turned on and off with the first switch Q1 kept in an off state.

It is preferable that the signal transmitting device 2 include the input unit 20, the output unit 21, and the step-down circuit 10, as described above. The step-down circuit 10 preferably includes the first and second capacitors C1 and C2, the switch circuit 24, the inductor L1, the first diode (internal diode of the first switch Q1) D1, the second diode (internal diode of the second switch Q2) D2, and the control circuit 22. The control circuit 22 is preferably configured to control the first and second switches Q1 and Q2 to change the voltage value of the output voltage V12 in order to transmit transmission data from the output unit 21. That is, the signal transmitting device 2 can transmit transmission data with a simpler configuration (circuit configuration) than that of the dimming interface (hereinafter referred to as a "conventional device") of the LED illumination system described in Document 1. Therefore, the signal transmitting device 2 can reduce the number of switches that constitute the device compared with the conventional device, and can reduce, for example conduction loss in the switches. That is, the signal transmitting device 2 can realize low loss compared with the conventional device.

Document 1 describes that the voltage (signal superposed voltage) to be outputted from the dimming interface is a voltage that has approximately the same amplitude as the DC voltage obtained from the AC/DC converter, and changes the polarity in accordance with the On and Off of the dimming signal from the dimmer. That is, in the LED illumination system described in Document 1, a diode bridge is needed to rectify the signal superposed voltage from the dimming interface. In contrast, the signal transmitting device 2 has an advantage in that the diode bridge such as that described in Document 1 becomes unnecessary, because the voltage value of the output voltage V12 is switched between the first and second voltage values v1 and v2, and therefore, the voltage value of the output voltage V12 does not take a negative value.

The control circuit 22 discharges a charge accumulated in the second capacitor C2 by repeatedly turning on and off the first switch Q1 with the second switch Q2 kept in an off state, and thereby steps down the voltage value of the output voltage V12 from the first voltage value v1 to the second voltage value v2. Accordingly, the signal transmitting device 2 can switch the voltage value of the output voltage V12 from the first voltage value v1 to the second voltage value v2 in a shorter time than the signal transmitting device of the following comparative example. The signal transmitting device of the comparative example is a device in which the voltage value of the output voltage V12 is stepped down from the first voltage value v1 to the second voltage value v2 by repeatedly turning on and off the second switch Q2 with the first switch Q1 kept in an off state. In short, the signal transmitting device of the comparative example is a common step-down chopper circuit. Therefore, in the signal transmitting device 2, the transmission time period of transmission data can be reduced compared with the signal transmitting device of the comparative example. That is, the signal transmitting device 2 can transmit transmission data in a relatively short time.

The control circuit 22 repeatedly turns on and off the first switch Q1 with the second switch Q2 kept in an off state in the case where the control mode is the second control mode and the voltage value of the output voltage V12 is switched from the first voltage value v1 to the second voltage value v2, but the configuration is not limited thereto. The control circuit 22 may keep the first switch Q1 in an on state and the second switch Q2 in an off state in the case where the control mode is the second control mode and the voltage value of the output voltage V12 is switched from the first voltage value v1 to the second voltage value v2. In this case, the first switch Q1 may be a MOSFET having a relatively high breakdown voltage property. Note that the signal transmitting device 2 repeatedly turns on and off the first switch Q1 with the second switch Q2 kept in an off state and can thereby suppress a large current flowing through the first switch Q1 and prevent excessive stress form being applied to the first switch Q1. As a result, the signal transmitting device 2 can have an extended life span of the first switch Q1.

Also, the control circuit 22 repeatedly turns on and off the second switch Q2 with the first switch Q1 kept in an off state in the case where the control mode is the second control mode and the voltage value of the output voltage V12 is switched from the second voltage value v2 to the first voltage value v1, but the configuration is not limited thereto.

The control circuit 22 may keep the first switch Q1 in an off state and the second switch Q2 in an on state in the case where the control mode is the second control mode and the voltage value of the output voltage V12 is switched from the second voltage value v2 to the first voltage value v1. In this case, the voltage value of the output voltage V12 can be switched from the second voltage value v2 to the first voltage value v1 in a shorter time than in the case of repeatedly turning on and off the second switch Q2 with the first switch Q1 kept in an off state. Therefore, in the case where the first switch Q1 is kept in an off state and the second switch Q2 is kept in an on state, the transmission time period of transmission data can be shorter than in a case where the second switch Q2 is repeatedly turned on and off with the first switch Q1 kept in an off state. As a result, the signal transmitting device 2 can transmit transmission data in a shorter time. Note that, it is possible that a large current will flow through the second switch Q2 and excessive stress will be applied to the second switch Q2, and therefore the second switch Q2 needs to be a MOSFET having a relatively high breakdown voltage property.

On the other hand, the signal transmitting device 2 repeatedly turns on and off the second switch Q2 with the first switch Q1 kept in an off state, thereby suppressing a large current flowing through the second switch Q2 and preventing excessive stress from being applied to the second switch Q2. As a result, the signal transmitting device 2 can suppress an increase in the cost of the second switch Q2 and have an extended life span of the second switch Q2.

The first switch Q1 is not limited to a MOSFET, but may be an insulated gate bipolar transistor. In this case, a collector of the first switch Q1 may be electrically connected to the terminal on the high potential side of the first capacitor C1, a gate of the first switch Q1 may be electrically connected to the control circuit 22, and an emitter of the first switch Q1 may be electrically connected to the drain of the second switch Q2. Also, in this case, a diode (an external diode) may be electrically connected between the collector and the emitter of the first switch Q1. An anode of the diode may be electrically connected to the emitter of the first switch Q1, and a cathode of the diode may be electrically connected to the collector of the first switch Q1. However, if the first switch Q1 is the MOSFET, the internal diode D1 is electrically connected in parallel to the first switch Q1 and therefore the size of the signal transmitting device 2 can be reduced compared with a case where it is replaced with the insulated gate bipolar transistor. That is, the signal transmitting device 2 includes the internal diode D1 of the first switch Q1 without additional diode (external diode), and therefore can have a smaller size compared with a case where an insulated gate bipolar transistor and an external diode are provided.

The signal transmitting device 2 described above is merely one example of the present disclosure, and the present disclosure is not limited to the embodiment described above. In addition to the embodiment described above, various modifications can be made according to the design or the like, as long as they do not depart from the technical concept of the present disclosure. Hereinafter, modifications of the present embodiment will be enumerated.

The control circuit 22 may change the On time of the first switch Q1 over time when repeatedly turning on and off the first switch Q1 with the second switch Q2 kept in an off state, in the case where the voltage value of the output voltage V12 is switched from the first voltage value v1 to the second voltage value v2. Specifically, the control circuit 22 may gradually increase the On time of the first switch Q1 when repeatedly turning on and off the first switch Q1 with the second switch Q2 kept in an off state. For example, the control circuit 22 may continuously change the On time of the first switch Q1 such that the On time of the first switch Q1 gradually increases as the voltage value of the output voltage V12 approaches the second voltage value v2. In short, the control circuit 22 may increase the On time of the first switch Q1 as the voltage value of the output voltage V12 approaches the second voltage value v2, in the case where the voltage value of the output voltage V12 is switched from the first voltage value v1 to the second voltage value v2. According to this configuration, rapid discharge of a charge accumulated in the second capacitor C2 (discharge current abruptly flowing from the second capacitor C2) can be suppressed. Therefore, this configuration enables excessive stress to be applied to the first switch Q1, compared with a case where the On time of the first switch Q1 is not changed when the first switch Q1 is repeatedly turned on and off with the second switch Q2 kept in an off state.

The control circuit 22 may also change the switching frequency of the first switch Q1 over time when repeatedly turning on and off the first switch Q1 with the second switch Q2 kept in an off state, in the case where the voltage value of the output voltage V12 is switched from the first voltage value v1 to the second voltage value v2. Specifically, the control circuit 22 may gradually decrease the switching frequency of the first switch Q1 when repeatedly turning on and off the first switch Q1 with the second switch Q2 kept in an off state. For example, the control circuit 22 may continuously change the switching frequency of the first switch Q1 such that the switching frequency of the first switch Q1 gradually decreases as the voltage value of the output voltage V12 approaches the second voltage value v2. In short, the control circuit 22 may decrease the switching frequency of the first switch Q1 as the voltage value of the output voltage V12 approaches the second voltage value v2, in the case where the voltage value of the output voltage V12 is switched from the first voltage value v1 to the second voltage value v2. According to this configuration as well, rapid discharge of a charge accumulated in the second capacitor C2 (discharge current abruptly flowing from the second capacitor C2) can be suppressed. Therefore, this configuration enables excessive stress to be applied to the first switch Q1, compared with a case where the switching frequency of the first switch Q1 is not changed when the first switch Q1 is repeatedly turned on and off with the second switch Q2 kept in an off state.

Here, the control circuit 22 may be configured to change both the On time of the first switch Q1 and the switching frequency of the first switch Q1 over time, in the case of repeatedly turning on and off the first switch Q1 with the second switch Q2 kept in an off state. That is, the control circuit 22 may be configured to change at least one of the On time of the first switch Q1 and the switching frequency of the first switch Q1 over time, in the case of repeatedly turning on and off the first switch Q1 with the second switch Q2 kept in an off state. In the case where both the On time of the first switch Q1 and the switching frequency of the first switch Q1 are changed, the application of excessive stress on the first switch Q1 can be suppressed more than in a case where the On time of the first switch Q1 or the switching frequency of the first switch Q1 is changed.

The control circuit 22 may change the On time of the first switch Q1 stepwise such that the On time of the first switch Q1 gradually increases as the voltage value of the output voltage V12 approaches the second voltage value v2. Similarly, the control circuit 22 may change the switching frequency of the first switch Q1 stepwise such that the switching frequency of the first switch Q1 gradually decreases as the voltage value of the output voltage V12 approaches the second voltage value v2.

The control circuit 22 may change the switching frequency of the second switch Q2 over time when repeatedly turning on and off the second switch Q2 with the first switch Q1 kept in an off state, in the case where the voltage value of the output voltage V12 is switched from the second voltage value v2 to the first voltage value v1. Specifically, the control circuit 22 may gradually decrease the switching frequency of the second switch Q2 in the case of repeatedly turning on and off the second switch Q2 with the first switch Q1 kept in an off state. For example, the control circuit 22 may change the switching frequency of the second switch Q2 such that the switching frequency of the second switch Q2 gradually decreases as the voltage value of the output voltage V12 approaches the first voltage value v1. In short, the control circuit 22 may decrease the switching frequency of the second switch Q2 as the voltage value of the output voltage V12 approaches the first voltage value v1, in the case where the voltage value of the output voltage V12 is switched from the second voltage value v2 to the first voltage value v1. This configuration can also suppress excessive stress to be applied to the second switch Q2 more than in a case where the switching frequency of the second switch Q2 is not changed when the second switch Q2 is repeatedly turned on and off with the first switch Q1 kept in an off state.

Here, the control circuit 22 may be configured to change both the On time of the second switch Q2 and the switching frequency of the second switch Q2 over time, in the case of repeatedly turning on and off the second switch Q2 with the first switch Q1 kept in an off state. That is, the control circuit 22 may be configured to change at least one of the On time of the second switch Q2 and the switching frequency of the second switch Q2 over time, in the case of repeatedly turning on and off the second switch Q2 with the first switch Q1 kept in an off state. In the case where both the On time of the second switch Q2 and the switching frequency of the second switch Q2 are changed, the application of excessive stress on the second switch Q2 can be suppressed more than in a case where the On time of the second switch Q2 or the switching frequency of the second switch Q2 is changed.

The control circuit 22 may change the On time of the second switch Q2 continuously or stepwise such that the On time of the second switch Q2 gradually increases as the voltage value of the output voltage V12 approaches the first voltage value v1.

Similarly, the control circuit 22 may change the switching frequency of the second switch Q2 continuously or stepwise such that the switching frequency of the second switch Q2 gradually decreases as the voltage value of the output voltage V12 approaches the first voltage value v1.

The signal transmitting device 2 may be provided with a rectifying element, for preventing a current from flowing into the step-down circuit 10 from the output unit 21, in an electric path between the first output terminal 21A and the terminal on the high potential side of the second capacitor C2. The rectifying element may be, for example a diode. In this case, an anode of the rectifying element may be electrically connected to the terminal on the high potential side of the second capacitor C2, and a cathode of the rectifying element may be electrically connected to the first output terminal 21A. This configuration can suppress an over current flowing into the step-down circuit 10, and therefore extend the life span of the step-down circuit 10. Note that the rectifying element is not limited to the diode, but may be, for example a P-channel MOSFET. In this case, a source of the P-channel MOSFET may be electrically connected to the terminal on the high potential side of the second capacitor C2, a gate of the P-channel MOSFET may be electrically connected to the control circuit 22, and a drain of the P-channel MOSFET may be electrically connected to the first output terminal 21A. Also, in this case, the control circuit 22 may keep the P-channel MOSFET in an on state in the case where the control mode is the first control mode, and may keep the P-channel MOSFET in an off state in the case where the control mode is the second control mode. Also, the rectifying element may be provided in an electric path between the second output terminal 21B and the terminal on the low potential side of the second capacitor C2, other than the electric path between the first output terminal 21A and the terminal on the high potential side of the second capacitor C2. In this case, an anode of the rectifying element may be electrically connected to the terminal, on a low potential side, of the second capacitor C2, and a cathode of the rectifying element may be electrically connected to the second output terminal 21B. Also, the rectifying element may be provided, not limited to in the signal transmitting device 2 but in the lighting device 3 or the signal receiving device 6.

The control circuit 22 controls the first and second switches Q1 and Q2 such that the start of the time slot matches the start of a change (fall) in the output voltage V12, but the configuration is not limited thereto. The control circuit 22 may start to change the output voltage V12 in an arbitrary time period within the time slot.

Also, the control circuit 22 turns off the first switch Q1 with the second switch Q2 kept in an off state when the first predetermined time T1 has elapsed from when the first switch Q1 was turned on and the second switch Q2 was turned off such that the current IL1 will not exceed the rated current, but the configuration is not limited thereto. The control circuit 22 may turn off the first switch Q1 with the second switch Q2 kept in an off state, for example when the current value of the current IL1 reaches a threshold (first threshold). In this case, the signal transmitting device 2 may include a secondary winding that is magnetically coupled to the inductor L1 (primary winding), and the control circuit 22 may turn off the first switch Q1 with the second switch Q2 kept in an off state when the current value of a current generated in the secondary winding reaches the first threshold. Also, in this case, the control circuit 22 may turn on the first switch Q1 with the second switch Q2 kept in an off state when the current value of a current generated in the secondary winding reaches zero.

Hereinafter, an illumination system 100 including the signal transmitting device 2 discussed above will be described. As shown in FIG. 1, the illumination system 100 preferably includes the DC power supply device 1, the signal transmitting device 2, the lighting device 3, the light source 4, the operation device 5, and the signal receiving device 6.

Preferably, the DC power supply device 1 is configured to convert the AC voltage of an AC power supply 200 to a DC voltage (input voltage V11). The DC power supply device 1 may also be configured to output the input voltage V11 to the signal transmitting device 2 via the pair of feeding paths E11 and E12. The AC power supply 200 may be, for example a commercial power supply. The effective value of the AC voltage may be, for example 100 [V]. The frequency of the AC voltage (power supply frequency) may be, for example 50 or 60 [Hz]. Note that the illumination system 100 need not include the AC power supply 200 as a constituent element.

Preferably, the lighting device 3 is configured to light the light source 4 by the output voltage V12 outputted from the output unit 21 of the signal transmitting device 2. The lighting device 3 may also be configured to change the output (output current) to the light source 4 based on transmission data obtained by the later-described receiving circuit 62 of the signal receiving device 6. In the example of FIG. 1, the lighting device 3 includes an input unit 30, an output unit 31, and a constant current circuit 32.

Preferably, the input unit 30 is configured to receive the output voltage V12 via the pair of feeding paths E21 and E22. The input unit 30 may include a pair of input terminals 30A and 30B. The input terminal 30A may be electrically connected to the first output terminal 21A via the feeding path E21. The input terminal 30B may be electrically connected to the second output terminal 21B via the feeding path E22. The input terminal 30B may also be electrically connected to ground (ground of the lighting device 3).

Preferably, the output unit 31 is electrically connected to the light source 4 via a pair of feeding paths E31 and E32. The output unit 31 may include a pair of output terminals 31A and 31B. The output terminal 31A may be electrically connected to one end of the feeding path E31. The output terminal 31B may be electrically connected to one end of the feeding path E32. The other ends of the pair of feeding paths E31 and E32 may be electrically connected to the light source 4.

Preferably, the constant current circuit 32 is configured to cause the current value of a current I1 flowing to the light source 4 to match a target value. The constant current circuit 32 may be, for example a step-down switching converter. The constant current circuit 32 may change the lighting state of the light source 4 by increasing or decreasing the current I1 when the target value is changed. Note that, in the present embodiment, the current I1 flowing to the light source 4 corresponds the output current of the lighting device 3.

Preferably, the light source 4 includes a plurality of solid-state light-emitting elements 40. Each of the plurality of solid-state light-emitting elements 40 may be, for example an LED (Light Emitting Diode). The LED may be an inorganic LED or an organic LED. The plurality of solid-state light-emitting elements 40 may be connected in series. A terminal of the light source 4 on an anode side may be electrically connected to the output terminal 31A via the feeding path E31. A terminal of the light source 4 on a cathode side may be electrically connected to the output terminal 31B via the feeding path E32.

Preferably, the operation device 5 is configured to receive an operation input made by a user. The operation device 5 may include an operation unit. The operation device 5 may be electrically connected to the control circuit 22. The operation device 5 may be, for example a dimmer. Examples of the operation unit include a dial (a dimming knob), a slider, and a push button switch. The operation device 5 may make an instruction to change the output of the lighting device 3 to the control circuit 22 when the user has operated the operation unit. For example, the operation device 5 may output an operation signal containing the instruction to change the output of the lighting device 3 to the control circuit 22 according to the operation result of the operation unit.

Preferably, the signal receiving device 6 is configured to receive the transmission data transmitted from the signal transmitting device 2. As shown in FIG. 1, the signal receiving device 6 may include a connection portion 60, a voltage-dividing circuit 61, and a receiving circuit 62.

The connection portion 60 may be electrically connected to the output unit 21 of the signal transmitting device 2 via a pair of feeding paths E41 and E42. The connection portion 60 may include first and second connection terminals 60A and 60B. The first connection terminal 60A may be electrically connected to the first output terminal 21A via the feeding path E41. The second connection terminal 60B may be electrically connected to the second output terminal 21B via the feeding path E42. The connection portion 60 may receive the output voltage V12 via the pair of feeding paths E41 and E42.

The voltage-dividing circuit 61 may be constituted by a series circuit of two resistors R1 and R2. The voltage-dividing circuit 61 may be electrically connected between the first and second connection terminals 60A and 60B. Specifically, a first terminal of the resistor R1 may be electrically connected to the first connection terminal 60A. A second terminal of the resistor R1 may be electrically connected to a first terminal of the resistor R2. A second terminal of the resistor R2 may be electrically connected to the second connection terminal 60B. The voltage-dividing circuit 61 may divide the output voltage V12 inputted to the connection portion 60 and output the divided voltage (voltage across the resistor R2) to the receiving circuit 62.

Preferably, the receiving circuit 62 is configured to detect a change in the voltage value of a voltage outputted from the voltage-dividing circuit 61 to obtain the transmission data. That is, the receiving circuit 62 may detect a change in the voltage value of the output voltage V12 inputted to the connection portion 60 to obtain the transmission data. The receiving circuit 62 may also be configured to output a PWM (Pulse Width Modulation) signal to the constant current circuit 32. The receiving circuit 62 is, for example a control IC (Integrated Circuit). The control IC may include a buffer memory.

The receiving circuit 62 may sample a voltage (detection voltage) outputted from the voltage-dividing circuit 61 at a fixed sampling period, and store the voltage value of the detection voltage to the buffer memory. Preferably, the sampling period is shorter than the time width T0 (refer to FIG. 3) in which the signal transmitting device 2 transmits 1-bit worth of transmission data. The receiving circuit 62 may also receive a transmission signal (start bit, transmission data, and stop bit) by comparing the voltage value of the detection voltage with a pre-set second threshold. For example, the receiving circuit 62 may determine that a bit having a value "1" has been received when the voltage value of the detection voltage decreases below the second threshold, and store the received bit value to the buffer memory. Preferably, the second threshold has a value that is larger than the second voltage value v2 and is smaller than the first voltage value v1. In the present embodiment, the receiving circuit 62 is configured to, when receiving the start bit, receive the transmission data that is to be transmitted following the start bit, and store the transmission data to the buffer memory. The receiving circuit 62 is also configured to, when receiving the stop bit, end storing of the transmission data to the buffer memory.

Preferably, the receiving circuit 62 reads the dimming level of the light source 4 from the transmission data stored in the buffer memory. The receiving circuit 62 may also convert the read dimming level to a PWM signal and output the converted PWM signal to the constant current circuit 32. The receiving circuit 62 may convert the dimming level to a PWM signal by changing the duty ratio of a square wave having a fixed period according to the dimming level. For example, the receiving circuit 62 sets the duty ratio to 100 [%] when the dimming level is 100 [%]. The receiving circuit 62 also sets the duty ratio to 50 [%] when the dimming level is 50 [%]. Furthermore, the receiving circuit 62 sets the duty ratio to 0 [%] when the dimming level is 0 [%].

Preferably, the constant current circuit 32 of the lighting device 3 is configured to change the lighting state of the light source 4 based on the PWM signal from the receiving circuit 62. Specifically, the constant current circuit 32 may change the target value of the current I1 flowing to the light source 4 based on the PWM signal from the receiving circuit 62. For example, when the duty ratio of the PWM signal is 100 [%], the constant current circuit 32 sets the target value of the current I1 to the current value (rated value) of the rated current of the light source 4. When the duty ratio of the PWM signal is 50 [%], the constant current circuit 32 sets the target value of the current I1 to a value that is half the rated value. When the duty ratio of the PWM signal is 0 [%], the constant current circuit 32 sets the target value of the current I1 to a value that is approximately zero.

Hereinafter, an example of the functions of the illumination system 100 will be described. Note that, hereinafter, a case where a user changes the dimming level of the light source 4 from 100 [%] to 50 [%] with the operation device 5 will be described.

The operation device 5 outputs an operation signal for setting the dimming level to 50 [%] to the control circuit 22 of the signal transmitting device 2. When receiving the operation signal from the operation device 5, the control circuit 22 selects the second control mode and converts the dimming level of 50 [%] contained in the operation signal to transmission data (8-bit bit string "01111111"). The control circuit 22 then controls the first and second switches Q1 and Q2 so as to transmit the start bit, the transmission data thereafter, and finally the stop bit, from the output unit 21. That is, the signal transmitting device 2 transmits a transmission signal from the output unit 21.

The transmission signal transmitted from the signal transmitting device 2 is received by the receiving circuit 62 of the signal receiving device 6. The receiving circuit 62 reads the dimming level from the transmission data contained in the received transmission signal and converts the read dimming level to a PWM signal. The receiving circuit 62 then outputs the converted PWM signal to the constant current circuit 32 of the lighting device 3. The constant current circuit 32 sets the target value of the current I1 flowing to the light source 4 to a value that is half the rated value according to the PWM signal from the receiving circuit 62. Accordingly, the current value of the current I1 becomes half of the rated value, and therefore the light amount (light flux) emitted from the light source 4 becomes approximately half of the light flux when the dimming level is 100 [%] (at rated lighting). That is, the light source 4 is adjusted to a light flux that is half of the light flux at the rated lighting.

The signal transmitting device 2, the lighting device 3, and the signal receiving device 6 may be included in constituent elements that constitute a lighting system 7 (refer to FIG. 1). That is, the lighting system 7 may include the signal transmitting device 2, the lighting device 3, and the signal receiving device 6.

Figure 9:
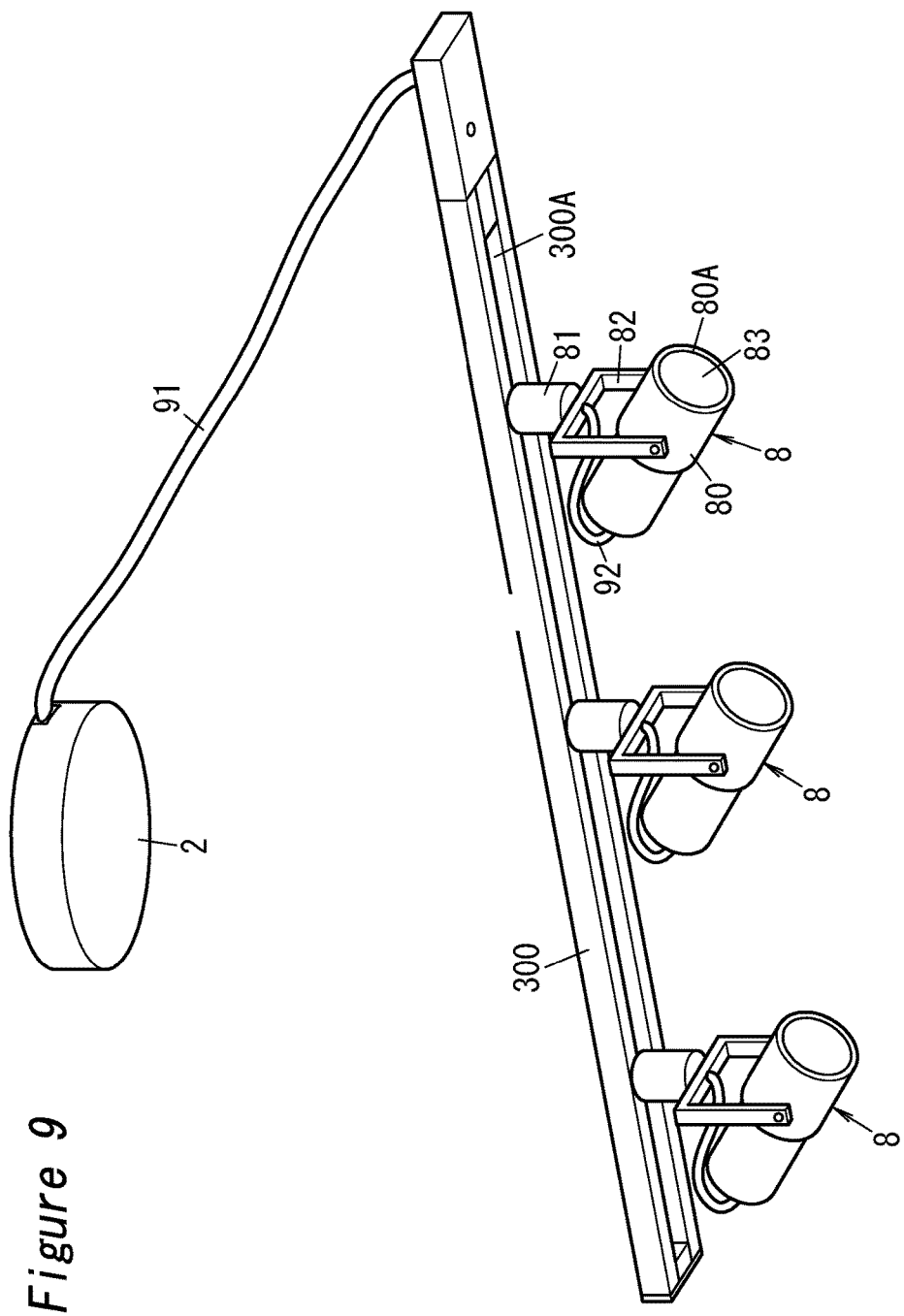
FIG. 9 is a perspective view of the signal transmitting device and the illumination fixture.

The lighting device 3, the light source 4, and the signal receiving device 6 may also be included in the constituent elements that constitute an illumination fixture 8 (refer to FIG. 1). That is, the illumination fixture 8 may include the lighting device 3, the light source 4, and the signal receiving device 6. The illumination fixture 8 may be, for example a spot light as shown in FIG. 9. The illumination fixture 8 may be combined with a lighting duct 300 for an illumination fixture. In the example of FIG. 9, a case where the number of the illumination fixtures 8 is three is illustrated. The three illumination fixtures 8 may be electrically connected in parallel to the output unit 21 of the signal transmitting device 2. Hereinafter, the configuration and function of one illumination fixture 8 from among the three illumination fixtures 8 will be described because the configurations and functions of the three illumination fixtures 8 are similar. Also, in the following, for convenience of the description, the lighting duct 300 for an illumination fixture is simply referred to as "duct 300".

Preferably, the duct 300 is attached to a ceiling. The duct 300 may be electrically connected to the signal transmitting device 2 via a first cable 91. That is, the duct 300 may be configured to receive the output voltage V12 from the signal transmitting device 2 via the first cable 91. The first cable 91 may include a pair of first wires.

The illumination fixture 8 may include a body 80, a plug 81, and an arm 82. The body 80 may include a window hole 80A. The lighting device 3, the light source 4, and the signal receiving device 6 may be housed inside the body 80. The window hole 80A may be covered by a panel 83.

The plug 81 may include a pair of electrode plates. The pair of electrode plates may be inserted through an insertion opening 300A of the duct 300 into the duct 300 and may be electrically connected to two conductors fixed inside the duct 300. The two conductors may be electrically connected to the signal transmitting device 2 via the first cable 91. Also, the plug 81 may be electrically connected to the lighting device 3 and the signal receiving device 6 that are housed inside the body 80 via a second cable 92.

Preferably, the arm 82 supports the body 80. The arm 82 may also be supported by the plug 81.

Note that the number of illumination fixtures 8 is not limited to three, but may be two, or four or more. The number of the illumination fixtures 8 may also be one.

As described above, a signal transmitting device 2 according to a first aspect includes an input unit 20, an output unit 21, and a step-down circuit 10. The input unit 20 includes first and second input terminals 20A and 20B configured to receive a DC input voltage V11. The output unit 21 includes first and second output terminals 21A and 21B configured to output a DC output voltage V12. The first output terminal 21A is electrically connected to the first input terminal 20A. The step-down circuit 10 is provided between the input unit 20 and the output unit 21. The step-down circuit 10 is configured to controllably adjust the output voltage V12 by stepping down the input voltage V11. The step-down circuit 10 includes first and second capacitors C1 and C2, a switch circuit 24, an inductor L1, first and second diodes (internal diodes) D1 and D2, and a control circuit 22. The first capacitor C1 is electrically connected between the first and second input terminals 20A and 20B. The second capacitor C2 is electrically connected between the first and second output terminals 21A and 21B. The switch circuit 24 is constituted by a series circuit of first and second switches (switches) Q1 and Q2. The switch circuit 24 is electrically connected in parallel to the first capacitor C1. The inductor L1 includes a first terminal 11 and a second terminal 12. The first terminal 11 of the inductor L1 is electrically connected to a connection point (first connection point) P1 of the first and second switches Q1 and Q2, and the second terminal 12 thereof is electrically connected to a connection point (second connection point) P2 of the second capacitor C2 and the second output terminal 21B. The first diode D1 is electrically connected in parallel to the first switch Q1. The first diode D1 also has a cathode electrically connected to a terminal (drain), on a high potential side, of the first switch Q1, and an anode electrically connected to a terminal (source), on a low potential side, of the first switch Q1. The second diode D2 is electrically connected in parallel to the second switch Q2. The second diode D2 also has a cathode electrically connected to a terminal (drain), on a high potential side, of the second switch Q2, and an anode electrically connected to a terminal (source), on a low potential side, of the second switch Q2. The control circuit 22 is configured to control the first and second switches Q1 and Q2. The control circuit 22 is configured to control the first and second switches Q1 and Q2 to change the voltage value of the output voltage V12 in order to transmit transmission data from the output unit 21.

The signal transmitting device 2 according to the first aspect can transmit transmission data with a simpler configuration (circuit configuration) than that of the dimming interface (conventional device) of the LED illumination system described in Document 1. Therefore, the signal transmitting device 2 according to the first aspect can reduce the number of switches that constitute the device compared with the conventional device, and can reduce, for example a conduction loss of the switches. That is, the signal transmitting device 2 according to the first aspect can reduce loss. The signal transmitting device 2 according to the first aspect also changes (adjusts) the output voltage V12 by stepping down the input voltage V11 through the step-down circuit 10, in the case of transmitting the transmission data from the output unit 21. Therefore, the signal transmitting device 2 according to the first aspect can quickly change the output voltage V12, and the power supplied to the lighting device 3 also changes quickly according to the change of the output voltage V12. As a result, the lighting device 3 can improve the efficiency in generating power for activating the constant current circuit 32.

A signal transmitting device 2 according to a second aspect can be realized by the combination with the signal transmitting device 2 according to the first aspect. In the signal transmitting device 2 according to the second aspect, the step-down circuit 10 is configured to switch the voltage value of the output voltage V12 between the first and second voltage values v1 and v2. The first voltage value v1 is the same as the voltage value of the input voltage V11. The second voltage value v2 is a value that is obtained by stepping down the input voltage V11. The control circuit 22 preferably includes, as control modes, first and second control modes. The first control mode is a control mode in which the voltage value of the output voltage V12 is prohibited from changing. The second control mode is a control mode in which the voltage value of the output voltage V12 is caused to change so as to transmit the transmission data from the output unit 21. The control circuit 22 is preferably configured to, in the case where the control mode is the first control mode, keep the first switch Q1 in an off state and the second switch Q2 in an on state such that the voltage value of the output voltage V12 becomes the first voltage value v1. The control circuit 22 is also preferably configured to, in the case where the control mode is the second control mode, control the first and second switches Q1 and Q2 such that the voltage value of the output voltage V12 is switched between the first and second voltage values v1 and v2 so as to transmit the transmission data from the output unit 21.

The signal transmitting device 2 according to the second aspect can transmit the transmission data with simpler control than that in the conventional device.

A signal transmitting device 2 according to a third aspect can be realized by the combination with the signal transmitting device 2 according to the second aspect. In the signal transmitting device 2 according to the third aspect, the control circuit 22 is preferably configured to, in the case where the control mode is the second control mode and the voltage value of the output voltage V12 is switched from the first voltage value v1 to the second voltage value v2, repeatedly turn on and off the first switch Q1 with the second switch Q2 kept in an off state. Alternatively, the control circuit 22 is preferably configured to, in the case where the control mode is the second control mode and the voltage value of the output voltage V12 is switched from the first voltage value v1 to the second voltage value v2, keep the first switch Q1 in an on state and the second switch Q2 in an off state. Also, the control circuit 22 is preferably configured to, in the case where the control mode is the second control mode and the voltage value of the output voltage V12 is kept at the second voltage value v2, repeatedly turn on and off the second switch Q2 with the first switch Q1 kept in an off state. Furthermore, the control circuit 22 is preferably configured to, in the case where the control mode is the second control mode and the voltage value of the output voltage V12 is switched from the second voltage value v2 to the first voltage value v1, repeatedly turn on and off the second switch Q2 with the first switch Q1 kept in an off state. Alternatively, the control circuit 22 is preferably configured to, in the case where the control mode is the second control mode and the voltage value of the output voltage V12 is switched from the second voltage value v2 to the first voltage value v1, keep the first switch Q1 in an off state and the second switch Q2 in an on state.

The signal transmitting device 2 according to the third aspect steps down the voltage value of the output voltage V12 by discharging a charge accumulated in the second capacitor C2, and can therefore switch the voltage value of the output voltage V12 from the first voltage value v1 to the second voltage value v2 in a shorter time than the signal transmitting device of the comparative example. The signal transmitting device 2 according to the third aspect can therefore reduce the transmission time period of the transmission data compared with the signal transmitting device of the comparative example. Furthermore, in the case of repeatedly turning on and off the first switch Q1 with the second switch Q2 kept in an off state, the signal transmitting device 2 according to the third aspect can perform suppression of a large current flowing through the first switch Q1, and also has an advantage in that the application of excessive stress to the first switch Q1 can be suppressed.

In addition, the signal transmitting device 2 according to the third aspect repeatedly turns on and off the second switch Q2 with the first switch Q1 kept in an off state in the case of switching the voltage value of the output voltage V12 from the second voltage value v2 to the first voltage value v1, and can therefore suppress a large current flowing through the second switch Q2. The signal transmitting device 2 according to the third aspect can therefore suppress the application of excessive stress to the second switch Q2, and can extend the life span of the second switch Q2. Furthermore, in the case where the first switch Q1 is kept in an off state and the second switch Q2 is kept in an on state, the voltage value of the output voltage V12 can be switched from the second voltage value v2 to the first voltage value v1 in a shorter time than in the case where the second switch Q2 is repeatedly turned on and off with the first switch Q1 kept in an off state. The signal transmitting device 2 according to the third aspect can therefore reduce the transmission time period of the transmission data compared with the case of repeatedly turning on and off the second switch Q2 with the first switch Q1 kept in an off state, and can transmit the transmission data in a shorter time.

A signal transmitting device 2 according to a fourth aspect can be realized by the combination with the signal transmitting device 2 according to the third aspect. In the signal transmitting device 2 according to the fourth aspect, the control circuit 22 is preferably configured to change at least one of an On time of the first switch Q1 and a switching frequency of the first switch Q1 over time, in the case of repeatedly turning on and off the first switch Q1 with the second switch Q2 kept in an off state.

The signal transmitting device 2 according to the fourth aspect can suppress rapid discharge of a charge accumulated in the second capacitor C2 (discharge current abruptly flowing from the second capacitor C2). In the case of repeatedly turning on and off the first switch Q1 with the second switch Q2 kept in an off state, the signal transmitting device 2 according to the fourth aspect can therefore suppress the application of excessive stress to the first switch Q1 compared with the case where the On time or the switching frequency of the first switch Q1 is not changed. Furthermore, in the case where both of the On time of the first switch Q1 and the switching frequency of the first switch Q1 are changed, the application of excessive stress to the first switch Q1 can be suppressed compared with the case where the On time of the first switch Q1 or the switching frequency of the first switch Q1 is changed.

A signal transmitting device 2 according to a fifth aspect can be realized by the combination with the signal transmitting device 2 according to the fourth aspect. In the signal transmitting device 2 according to the fifth aspect, the control circuit 22 is preferably configured to, in the case of switching the voltage value of the output voltage V12 from the first voltage value v1 to the second voltage value v2, increase the On time of the first switch Q1 as the voltage value of the output voltage V12 approaches the second voltage value v2.

The signal transmitting device 2 according to the fifth aspect can suppress rapid discharge of a charge accumulated in the second capacitor C2 (discharge current abruptly flowing from the second capacitor C2). The signal transmitting device 2 according to the fifth aspect can therefore, in the case of repeatedly turning on and off the first switch Q1 with the second switch Q2 kept in an off state, suppress the application of excessive stress to the first switch Q1 compared with the case where the On time of the first switch Q1 is not changed.

A signal transmitting device 2 according to a sixth aspect can be realized by the combination with the signal transmitting device 2 according to the fourth aspect. In the signal transmitting device 2 according to the sixth aspect, the control circuit 22 is configured to, in the case of switching the voltage value of the output voltage V12 from the first voltage value v1 to the second voltage value v2, decrease the switching frequency of the first switch Q1 as the voltage value of the output voltage V12 approaches the second voltage value v2.

The signal transmitting device 2 according to the sixth aspect can suppress rapid discharge of a charge accumulated in the second capacitor C2 (discharge current abruptly flowing from the second capacitor C2). The signal transmitting device 2 according to the sixth aspect can therefore, in the case of repeatedly turning on and off the first switch Q1 with the second switch Q2 kept in an off state, suppress the application of excessive stress to the first switch Q1 compared with the case where the switching frequency of the first switch Q1 is not changed.

A signal transmitting device 2 according to a seventh aspect can be realized by the combination with the signal transmitting device 2 according to any of the third to sixth aspects. In the signal transmitting device 2 according to the seventh aspect, the control circuit 22 is preferably configured to change at least one of an On time of the second switch Q2 and a switching frequency of the second switch Q2 over time, in the case of repeatedly turning on and off the second switch Q2 with the first switch Q1 kept in an off state.

The signal transmitting device 2 according to the seventh aspect can, in the case of repeatedly turning on and off the second switch Q2 with the first switch Q1 kept in an off state, suppress the application of excessive stress to the second switch Q2 compared with the case where the On time or the switching frequency of the second switch Q2 is not changed. Furthermore, in the case where both the On time of the second switch Q2 and the switching frequency of the second switch Q2 are changed, the application of excessive stress to the second switch Q2 can be suppressed compared with the case where the On time of the second switch Q2 or the switching frequency of the second switch Q2 is changed.

A signal transmitting device 2 according to an eighth aspect can be realized by the combination with the signal transmitting device 2 according to the seventh aspect. In the signal transmitting device 2 according to the eighth aspect, the control circuit 22 is preferably configured to, in the case of switching the voltage value of the output voltage V12 from the second voltage value v2 to the first voltage value v1, increase the On time of the second switch Q2 as the voltage value of the output voltage V12 approaches the first voltage value v1.

The signal transmitting device 2 according to the eighth aspect can, in the case of repeatedly turning on and off the second switch Q2 with the first switch Q1 kept in an off state, suppress the application of excessive stress to the second switch Q2 compared with the case where the On time of the second switch Q2 is not changed.

A signal transmitting device 2 according to a ninth aspect can be realized by the combination with the signal transmitting device 2 according to the seventh aspect. In the signal transmitting device 2 according to the ninth aspect, the control circuit 22 is preferably configured to, in the case of switching the voltage value of the output voltage V12 from the second voltage value v2 to the first voltage value v1, decrease the switching frequency of the second switch Q2 as the voltage value of the output voltage V12 approaches the first voltage value v1.

The signal transmitting device 2 according to the ninth aspect can, in the case of repeatedly turning on and off the second switch Q2 with the first switch Q1 kept in an off state and, suppress the application of excessive stress to the second switch Q2 compared with the case where the switching frequency of the second switch Q2 is not changed.

A signal transmitting device 2 according to a tenth aspect can be realized by the combination with the signal transmitting device 2 according to any of the second to ninth aspects. In the signal transmitting device 2 according to the tenth aspect, the control circuit 22 preferably further includes, as the control mode, a third control mode in which the output of the step-down circuit 10 is caused to stop. The control circuit 22 is preferably configured to keep at least the second switch Q2 in an off state, in the case where the control mode is the third control mode.

The signal transmitting device 2 according to the tenth aspect can stop power supply to the lighting device 3 through the first and second switches Q1 and Q2, for example when an abnormality occurs in the signal transmitting device 2.

A signal transmitting device 2 according to an eleventh aspect can be realized by the combination with the signal transmitting device 2 according to any of the second to tenth aspects. In the signal transmitting device 2 according to the eleventh aspect, the control circuit 22 preferably further includes, as the control mode, a fourth control mode in which the voltage value of the output voltage V12 is caused to change to a third voltage value v3 that is lower than the second voltage value v2 and is higher than 0 [V], and the output voltage V12 is outputted from the output unit 21.

The signal transmitting device 2 according to the eleventh aspect can supply a DC voltage required by the signal receiving device 6, for example while the light source 4 is turned off.

A signal transmitting device 2 according to a twelfth aspect can be realized by the combination with the signal transmitting device 2 according to the eleventh aspect. In the signal transmitting device 2 according to the twelfth aspect, the control circuit 22 is preferably configured to, in the case where the control mode is the fourth control mode, make the duration T5, for which the voltage value of the output voltage V12 is kept at the third voltage value v3, longer. Specifically, the control circuit 22 is preferably configured to make the time, in which the voltage value of the output voltage V12 is kept at the third voltage value v3, longer than a time (time width T4) in which, in the second control mode, the voltage value of the output voltage V12 is adjusted to the second voltage value v2.

The signal transmitting device 2 according to the twelfth aspect can prevent the signal receiving device 6 from erroneously detecting the third voltage value v3 as the second voltage value v2.

A signal transmitting device 2 according to a thirteenth aspect can be realized by the combination with the signal transmitting device 2 according to the eleventh or twelfth aspect. In the signal transmitting device 2 according to the thirteenth aspect, the third voltage value v3 is preferably a voltage value that is greater than or equal to the voltage value required by a circuit (receiving circuit 62 of the signal receiving device 6) that receives the output voltage V12 to function.

The signal transmitting device 2 according to the thirteenth aspect can allow the receiving circuit 62 of the signal receiving device 6 to function, for example while the light source 4 is turned off.

A signal transmitting device 2 according to a fourteenth aspect can be realized by the combination with the signal transmitting device 2 according to any of the eleventh to thirteenth aspects. In the signal transmitting device 2 according to the fourteenth aspect, the control circuit 22 is preferably configured to, in the case of shifting the control mode from the first control mode or the second control mode to the fourth control mode, repeatedly turns on and off the first switch Q1 with the second switch Q2 kept in an off state. Alternatively, the control circuit 22 is preferably configured to, in the case of shifting the control mode from the first control mode or the second control mode to the fourth control mode, repeatedly turn on and off the second switch Q2 with the first switch Q1 kept in an off state.

The signal transmitting device 2 according to the fourteenth aspect can gradually change (decrease) the voltage value of the output voltage V12 from the first voltage value v1 to the third voltage value v3.

As described above, a signal receiving device 6 according to a fifteenth aspect includes a connection portion 60 and a receiving circuit 62. The connection portion 60 is configured to be electrically connected to the output unit 21 of a signal transmitting device 2 according to any of the first to fourteenth aspects. The receiving circuit 62 is configured to detect a change in the voltage value of the output voltage V12 that is inputted to the connection portion 60 to obtain the transmission data.

The signal receiving device 6 according to the fifteenth aspect can receive the transmission data to be transmitted from the signal transmitting device 2.

As described above, a lighting system 7 according to a sixteenth aspect includes a signal transmitting device 2 according to any of the first to fourteenth aspects, the signal receiving device 6 according to the fifteenth aspect, and a lighting device 3. The signal receiving device 6 includes a connection portion 60 and a receiving circuit 62. The connection portion 60 is electrically connected to the output unit 21 of the signal transmitting device 2. The receiving circuit 62 is configured to detect a change in the voltage value of the output voltage V12 that is inputted to the connection portion 60 to obtain the transmission data. The lighting device 3 is configured to light the light source 4 with the output voltage V12 outputted from the output unit 21. The lighting device 3 is also configured to change the output to the light source 4 based on the transmission data obtained by the receiving circuit 62 of the signal receiving device 6.

A lighting system 7 including a signal transmitting device 2 that can reduce loss can be configured by the lighting system 7 according to the sixteenth aspect.

As described above, an illumination fixture 8 according to a seventeenth aspect includes the signal receiving device 6 according to the fifteenth aspect, a light source 4, and a lighting device 3. The lighting device 3 is configured to light the light source 4 with the output voltage V12 outputted from the output unit 21 of a signal transmitting device 2 according to any of the first to fourteenth aspects. The lighting device 3 is also configured to change the output to the light source 4 based on the transmission data obtained by the receiving circuit 62 of the signal receiving device 6.

An illumination fixture 8 including a signal receiving device 6 that can receive transmission data to be transmitted from a signal transmitting device 2 can be configured by the illumination fixture 8 according to the seventeenth aspect.

As described above, an illumination system 100 according to an eighteenth aspect includes the lighting system 7 according to the sixteenth aspect, a light source 4, a DC power supply device 1, and an operation device 5. The light source 4 is configured to be lit by the lighting device 3 of the lighting system 7. The DC power supply device 1 is configured to apply the input voltage V11 to the input unit 20 of the signal transmitting device 2 of the lighting system 7. The operation device 5 is configured to receive an operation input and output the operation signal to the signal transmitting device 2. The signal transmitting device 2 is configured to transmit the transmission data based on the operation signal.

An illumination system 100 including a signal transmitting device 2 that can reduce loss can be configured by the illumination system 100 according to the eighteenth aspect. Note that the DC power supply device 1 and the operation device 5 are not essential constituent elements of the illumination system 100, and can be omitted as appropriate.

An illumination system 100 according to a nineteenth aspect includes a signal transmitting device 2 according to any of the first to fourteenth aspects, an illumination fixture 8, a DC power supply device 1, and an operation device 5. The illumination fixture 8 includes a signal receiving device 6 that includes a connection portion 60 and a receiving circuit 62. The connection portion 60 is electrically connected to the output unit 21 of the signal transmitting device 2. The receiving circuit 62 is configured to detect a change in the voltage value of the output voltage V12 that is inputted to the connection portion 60 to obtain the transmission data. The DC power supply device 1 is configured to apply the input voltage V11 to the input unit 20 of the signal transmitting device 2 of the lighting system 7. The operation device 5 is configured to receive an operation input, and output the operation signal to the signal transmitting device 2. The signal transmitting device 2 is configured to transmit the transmission data based on the operation signal.

An illumination system 100 that includes a signal transmitting device 2 that can reduce loss can be configured by the illumination system 100 according to the nineteenth aspect. Note that the DC power supply device 1 and the operation device 5 are not essential constituent elements of the illumination system 100, and can be omitted as appropriate.

Note that, in the signal transmitting device 2, the first input terminal 20A is an input terminal on a high potential side, and the second input terminal 20B is an input terminal on a low potential side, but the configuration is not limited thereto. The first input terminal 20A may be an input terminal on a low potential side, and the second input terminal 20B may be an input terminal on a high potential side. In this case, a source of the first switch Q1 may be electrically connected to the first input terminal 20A, a drain of the first switch Q1 may be electrically connected to a source of the second switch Q2, and a drain of the second switch Q2 may be electrically connected to the second input terminal 20B.

The transmission data is not limited to the dimming level of the light source 4, but may be, for example a toning level for changing the color temperature of the light source 4 (adjusting the color of the light source 4). Also, the transmission data is not limited to the dimming level of the light source 4, but may be both the dimming level of the light source 4 and the toning level. Also, the transmission data is not limited to the dimming level of the light source 4, but may be audio data (music data), for example in the case where a speaker is incorporated into the illumination fixture 8. That is, the signal transmitting device 2 transmits audio data as the transmission data, and the speaker of the illumination fixture 8 can be driven to output audio (music) based on the transmission data obtained by the receiving circuit 62 of the signal receiving device 6.

The second switch Q2 is not limited to MOSFET, but may be, for example an insulated gate bipolar transistor. Also, the first and second switches Q1 and Q2 are switches of the same type, but may be switches of different types.

The DC power supply device 1 includes a function of converting an AC voltage to the input voltage V11, but may include a function of generating the input voltage V11. Also, the DC power supply device 1 may include a function of converting a DC voltage outputted from a solar power generator to the input voltage V11.

The lighting device 3 includes the constant current circuit 32, but is not limited thereto, and may include, for example a constant voltage circuit. The constant current circuit 32 is not limited to the step-down switching converter, but may be, for example a step-up switching converter or a step-up/down switching converter.

The connection of the plurality of solid-state light-emitting elements 40 is not limited to the series connection, but may be, for example a parallel connection or a connection in which a series connection and a parallel connection are combined. Also, each of the plurality of solid-state light-emitting elements 40 is not limited to an LED(s), but may be an organic EL (Electro Luminescence) element(s). Also the number of the solid-state light-emitting elements 40 is not limited to two or more, but may be one.

The operation device 5 is not limited to the dimmer, but may be a tablet terminal or a remote controller that transmits an operation signal to the control circuit 22 over wireless communication medium such as infrared or radio. In this case, the signal transmitting device 2 needs a receiving unit for receiving the operation signal.

The receiving circuit 62 converts the dimming level of the light source 4 to a PWM signal, but the configuration is not limited thereto. The receiving circuit 62 may convert the dimming level of the light source 4 to a voltage signal in which the dimming level is designated by the voltage value of a DC voltage.

The illumination fixture 8 is not limited to the spot light, but may be, for example a downlight.

In the illumination system 100, the DC power supply device 1 and the signal transmitting device 2 are configured as separate units, but may be integrally configured.

The invention claimed is:
1. A signal transmitting device comprising:
an input unit including first and second input terminals configured to receive a DC input voltage;
an output unit including first and second output terminals configured to output a DC output voltage, the first output terminal being electrically connected to the first input terminal; and
a step-down circuit that is provided between the input unit and the output unit, and is configured to controllably adjust the output voltage by stepping down the input voltage, the step-down circuit including:
a first capacitor electrically connected between the first and second input terminals;
a second capacitor electrically connected between the first and second output terminals;
a switch circuit that includes a series circuit of first and second switches, and is electrically connected in parallel to the first capacitor;
an inductor that includes a first terminal electrically connected to a connection point of the first and second switches, and a second terminal electrically connected to a connection point of the second capacitor and the second output terminal;
a first diode that is electrically connected in parallel to the first switch and has a cathode electrically connected to a terminal of the first switch on a high potential side of the first switch and an anode electrically connected to a terminal of the first switch on a low potential side of the first switch;
a second diode that is electrically connected in parallel to the second switch and has a cathode electrically connected to a terminal of the second switch on a high potential side of the second switch and an anode being electrically connected to a terminal of the second switch on a low potential side of the second switch; and a control circuit configured to control the first and second switches, the control circuit being configured to control the first and second switches to change a voltage value of the output voltage in order to transmit transmission data from the output unit.

2. The signal transmitting device according to claim 1, wherein the step-down circuit is configured to switch the voltage value of the output voltage between a first voltage value that is the same as a voltage value of the input voltage and a second voltage value that is obtained by stepping down the input voltage, the control circuit includes, as control modes for controlling the first and second switches, a first control mode in which the voltage value of the output voltage is prohibited from changing, and a second control mode in which the voltage value of the output voltage is caused to change so as to transmit the transmission data from the output unit, the control circuit is configured to, in a case where the control mode is the first control mode, keep the first switch in an off state and the second switch in an on state such that the voltage value of the output voltage becomes the first voltage value, and the control circuit is configured to, in a case where the control mode is the second control mode, control the first and second switches such that the voltage value of the output voltage is switched between the first voltage value and the second voltage value so as to transmit the transmission data from the output unit.

3. The signal transmitting device according to claim 2, wherein the control circuit is configured to, in a case where the control mode is the second control mode and the voltage value of the output voltage is switched from the first voltage value to the second voltage value, repeatedly turn on and off the first switch with the second switch kept in an off state, or keep the first switch in an on state and the second switch in an off state, the control circuit is configured to, in a case where the control mode is the second control mode and the voltage value of the output voltage is to be kept at the second voltage value, repeatedly turn on and off the second switch with the first switch kept in an off state, and the control circuit is configured to, in a case where the control mode is the second control mode and the voltage value of the output voltage is switched from the second voltage value to the first voltage value, repeatedly turn on and off the second switch with the first switch kept in an off state, or keep the first switch in an off state and the second switch in an on state.

4. The signal transmitting device according to claim 3, wherein the control circuit is configured to change at least one of an On time of the first switch and a switching frequency of the first switch over time, in a case of repeatedly turning on and off the first switch with the second switch kept in an off state.

5. The signal transmitting device according to claim 4, wherein the control circuit is configured to, in a case of switching the voltage value of the output voltage from the first voltage value to the second voltage value, increase the On time of the first switch as the voltage value of the output voltage approaches the second voltage value.

6. The signal transmitting device according to claim 4, wherein the control circuit is configured to, in a case of switching the voltage value of the output voltage from the first voltage value to the second voltage value, decrease the switching frequency of the first switch as the voltage value of the output voltage approaches the second voltage value.

7. The signal transmitting device according to claim 3, wherein the control circuit is configured to change at least one of an On time of the second switch and a switching frequency of the second switch over time, in a case of repeatedly turning on and off the second switch with the first switch kept in an off state.

8. The signal transmitting device according to claim 7, wherein the control circuit is configured to, in a case of switching the voltage value of the output voltage from the second voltage value to the first voltage value, increase the On time of the second switch as the voltage value of the output voltage approaches the first voltage value.

9. The signal transmitting device according to claim 7, wherein the control circuit is configured to, in a case of switching the voltage value of the output voltage from the second voltage value to the first voltage value, decrease the switching frequency of the second switch as the voltage value of the output voltage approaches the first voltage value.

10. The signal transmitting device according to claim 2, wherein the control circuit further includes, as the control mode, a third control mode in which the output of the step-down circuit is caused to stop, and the control circuit is configured to keep at least the second switch in an off state in a case where the control mode is the third control mode.

11. The signal transmitting device according to claim 2, wherein the control circuit further includes, as the control mode, a fourth control mode in which the voltage value of the output voltage is caused to change to a third voltage value that is lower than the second voltage value and is higher than 0[V], and the output voltage is outputted from the output unit.

12. The signal transmitting device according to claim 11, wherein the control circuit is configured to, in a case where the control mode is the fourth control mode, make a time in which the voltage value of the output voltage is kept at the third voltage value longer than a time in which, in the second control mode, the voltage value of the output voltage is kept at the second voltage value.

13. The signal transmitting device according to claim 11, wherein the third voltage value is a voltage value that is greater than or equal to a voltage value required by a circuit that receives the output voltage to function.

14. The signal transmitting device according to claim 11, wherein the control circuit is configured to, in a case of shifting the control mode from the first control mode or the second control mode to the fourth control mode, repeatedly turn on and off the first switch with the second switch kept in an off state, or repeatedly turn on and off the second switch with the first switch kept in an off state.

15. A signal receiving device comprising:

a connection portion configured to be electrically connected to the output unit of the signal transmitting device according to claim 1; and a receiving circuit configured to detect a change in the voltage value of the output voltage that is inputted to the connection portion to obtain the transmission data.

16. A lighting system comprising:

the signal transmitting device according to claim 1;

a signal receiving device that includes a connection portion that is electrically connected to the output unit of the signal transmitting device and a receiving circuit configured to detect a change in the voltage value of the output voltage that is inputted to the connection portion to obtain the transmission data; and a lighting device configured to light a light source by the output voltage outputted from the output unit, the lighting device being configured to change the output to the light source based on the transmission data obtained by the receiving circuit of the signal receiving device.

17. An illumination fixture comprising:
the signal receiving device according to claim 15;
a light source; and
a lighting device configured to light the light source with the output voltage outputted from the output unit of the signal transmitting device,
the lighting device being configured to change the output to the light source based on the transmission data obtained by the receiving circuit of the signal receiving device.

18. An illumination system comprising:
the lighting system according to claim 16;
the light source that is configured to be lit by the lighting device of the lighting system;
a DC power supply device configured to apply the input voltage to the input unit of the signal transmitting device in the lighting system; and
an operation device configured to receive an operation input and output the operation signal to the signal transmitting device,
the signal transmitting device being configured to transmit the transmission data based on the operation signal.

19. An illumination system comprising:
the signal transmitting device according to claim 1;
an illumination fixture including a signal receiving device that includes a connection portion that is electrically connected to the output unit of the signal transmitting device and a receiving circuit configured to detect a change in the voltage value of the output voltage that is inputted to the connection portion to obtain the transmission data;
a DC power supply device configured to apply the input voltage to the input unit of the signal transmitting device; and
an operation device configured to receive an operation input and output the operation signal to the signal transmitting device, wherein
the signal transmitting device is configured to transmit the transmission data based on the operation signal.

20. An illumination fixture comprising:
a connection portion;
a receiving circuit configured to detect a change in voltage value of a voltage that is inputted to the connection portion to obtain transmission data;
a lighting device configured to light a light source by the voltage inputted to the connection portion; and
the lighting device being configured to change the output to the light source based on the transmission data.

21. An illumination fixture comprising:
a light source;
a connection portion;
a receiving circuit configured to detect a change in voltage value of a voltage that is inputted to the connection portion to obtain transmission data;
a lighting device configured to light the light source by the voltage inputted to the connection portion; and
the lighting device being configured to change the output to the light source based on the transmission data.

* * * * *